US012586024B2

(12) United States Patent
Barat et al.

(10) Patent No.: US 12,586,024 B2
(45) Date of Patent: Mar. 24, 2026

(54) DIGITAL TWIN BASED SYSTEMS AND METHODS FOR BUSINESS CONTINUITY PLAN AND SAFE RETURN TO WORKPLACE

(71) Applicant: Tata Consultancy Services Limited, Mumbai (IN)

(72) Inventors: Souvik Barat, Pune (IN); Vinay Kulkarni, Pune (IN); Avinash Mahadeo Bhide, Thane West (IN); Prabha Thomas, Mumbai (IN); Dushyanthi Mulpuru, Pune (IN); Savitha Samudrala, Bangalore (IN); Abhishek Yadav, Pune (IN); Anwesha Basu, Pune (IN); Keerthi Kumar Krishna, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 459 days.

(21) Appl. No.: 18/125,774

(22) Filed: Mar. 24, 2023

(65) Prior Publication Data

US 2023/0376877 A1     Nov. 23, 2023

(30) Foreign Application Priority Data

May 18, 2022    (IN) .............................. 202221028446

(51) Int. Cl.
*G06Q 10/0639*          (2023.01)
(52) U.S. Cl.
CPC .............................. *G06Q 10/06393* (2013.01)
(58) Field of Classification Search
CPC ......... G06Q 10/06393; G06Q 10/0635; G06Q 10/0631; G16H 50/20; G16H 50/50; G16H 50/80
See application file for complete search history.

(56) References Cited

U.S. PATENT DOCUMENTS

2021/0050116 A1*  2/2021  Sabeti .................... G16H 50/70
2022/0102012 A1*  3/2022  Son ........................ G16H 50/50
(Continued)

OTHER PUBLICATIONS

Barat et al., "An Agent-Based Digital Twin for Exploring Localized Non-pharmaceutical Interventions to Control COVID-19 Pandemic," Transactions of the Indian National Academy of Engineering, 6:323-353 (2021).
(Continued)

*Primary Examiner* — Chinyere Mpamugo
(74) *Attorney, Agent, or Firm* — Finnegan, Henderson, Farabow, Garrett & Dunner, LLP

(57)             ABSTRACT
Organizations are struggling to ensure business continuity without compromising on delivery excellence in the face of pandemic related uncertainties which exists along multiple dimensions effected by authorities. This uncertainty plays out in a non-uniform manner thus leading to highly heterogeneous evolution of pandemic. Present disclosure provides digital twin based systems and methods for business continuity plan and safe return to workplace wherein a simulation-based data-driven evidence-backed approach is implemented that captures details pertaining to virus, individualistic characteristics of employees and their dependents, offices, locations of the employees and offices, and various pandemic control measures that are in effect and need to be explored using a hybrid modelling and simulation approach that combines fine-grained actor/agent model and coarse-grained stock-and-flow model. The present disclosure further leverages past macro-level data pertaining to pandemic evolution of relevant cities, states, and countries to make available information amenable for collective analysis and infection prediction.

17 Claims, 11 Drawing Sheets

(56)        References Cited

U.S. PATENT DOCUMENTS

| 2022/0384048 A1 * | 12/2022 | Gopalakrishnan ..... | G16H 50/20 |
| 2022/0384054 A1 * | 12/2022 | Wani ...................... | G16H 50/80 |
| 2022/0415524 A1 * | 12/2022 | Kefayati ............... | G16H 50/80 |
| 2023/0115691 A1 * | 4/2023 | Djaparidze ............ | G06Q 40/08 |
| | | | 705/4 |

OTHER PUBLICATIONS

Mokhtari et al., "A multi-method approach to modeling COVID-19 disease dynamics in the United States," Scientific Reports, 11:12426 (2021).
Pang et al., "Collaborative City Digital Twin for the COVID-19 Pandemic: A Federated Learning Solution," 26(5) (2021).
Silva et al., "COVID-ABS: An agent-based model of COVID-19 epidemic to simulate health and economic effects of social distancing interventions," Chaos, Solitons and Fractals, 139 (2020).
Wang et al., "Simulation Agent-Based Model to Demonstrate the Transmission of COVID-19 and Effectiveness of Different Public Health Strategies," 3(642321) (2021).

* cited by examiner

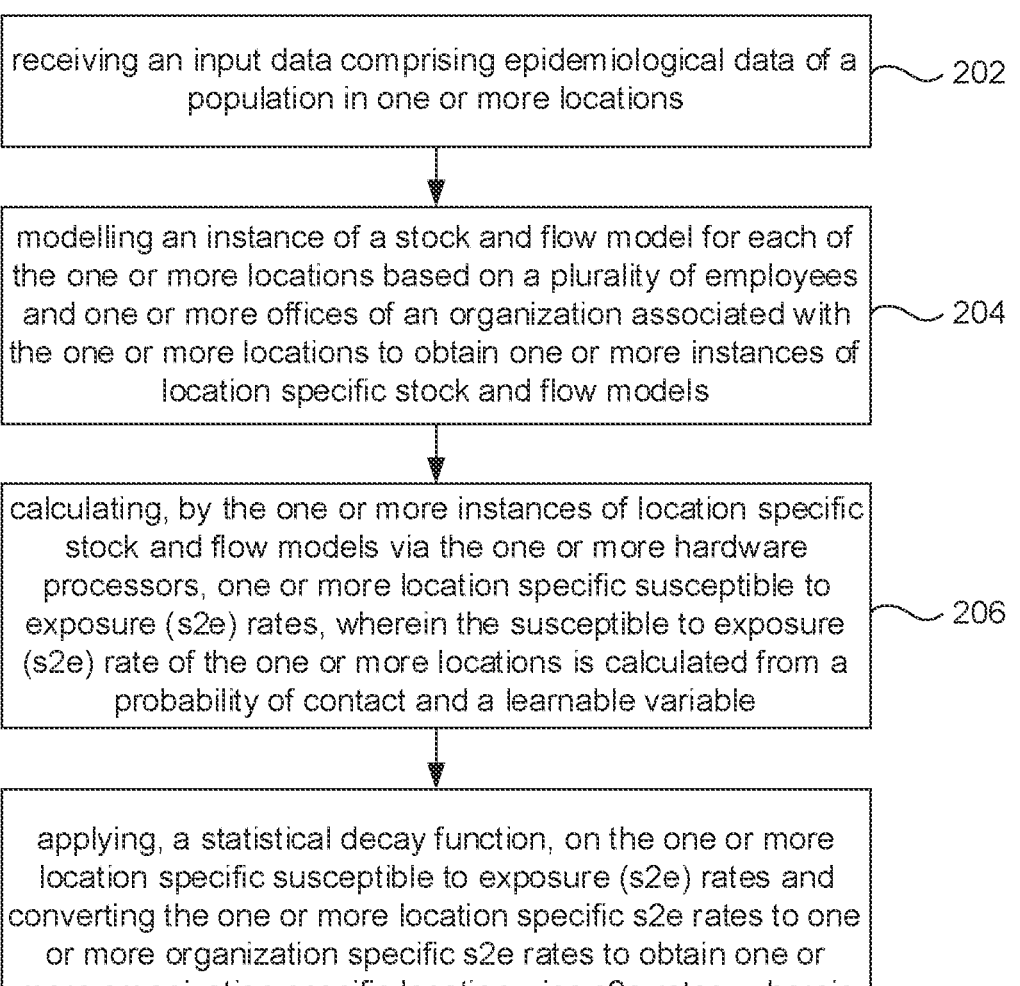

receiving an input data comprising epidemiological data of a population in one or more locations ⌐∿ 202 modelling an instance of a stock and flow model for each of the one or more locations based on a plurality of employees and one or more offices of an organization associated with the one or more locations to obtain one or more instances of location specific stock and flow models ⌐∿ 204 calculating, by the one or more instances of location specific stock and flow models via the one or more hardware processors, one or more location specific susceptible to exposure (s2e) rates, wherein the susceptible to exposure (s2e) rate of the one or more locations is calculated from a probability of contact and a learnable variable ⌐∿ 206 applying, a statistical decay function, on the one or more location specific susceptible to exposure (s2e) rates and converting the one or more location specific s2e rates to one or more organization specific s2e rates to obtain one or more organization specific location wise s2e rates, wherein each of the one or more organization specific s2e rates corresponds to a specific location amongst the one or more locations, and wherein the one or more organization specific location wise s2e rates comprises differences in demographic characteristics, health profile related features, and pandemic specific behaviour of the plurality of employees of the organization and the one or more associated dependents ⌐∿ 208

FIG. 3A

creating at least one of (a) an employee-based digital twin based on (i) the epidemiological data, (ii) a demographic and health profile related features for the plurality of employees of the organization and the one or more associated dependents, (iii) the one or more organization specific location wise s2e rates, and (b) an office-based digital twin based on (i) the epidemiological data, (ii) the demographic and health profile related features for the plurality of employees of the organization and the one or more associated dependents, (iii) an office and infrastructure data, and (iv) the one or more organization specific location wise s2e rates, wherein the employee-based digital twin and the office-based digital twin are created by modeling information pertaining to employees comprising at least an age, a gender, one or more comorbidities, a vaccine status, dependents data, the one or more offices, one or more employee associated project details, one or more desks within one or more offices, and one or more facilities within the one or more offices, wherein the employee-based digital twin comprises a first set of Key Performance Indicators (KPIs) with an associated initial value, and wherein the office-based digital twin comprises a second set of Key Performance Indicators (KPIs) with an associated initial value            ⌐~ 210 identifying an updated value of a corresponding KPI comprised in the at least one of the first set of Key Performance Indicators (KPIs) and the second set of Key Performance Indicators (KPIs) based on a simulation of the at least one of the employee-based digital twin and the office-based digital twin respectively, and wherein the updated value of a corresponding KPI comprised in the at least one of the first set of Key Performance Indicators (KPIs) and the second set of Key Performance Indicators (KPIs) is indicative of infection of one or more employees and dependents being predicted at one or more aggregation levels of the one or more offices of the organization            ⌐~ 212

FIG. 3B

DIGITAL TWIN BASED SYSTEMS AND METHODS FOR BUSINESS CONTINUITY PLAN AND SAFE RETURN TO WORKPLACE

PRIORITY CLAIM

This U.S. patent application claims priority under 35 U.S.C. § 119 to: India Application No. 202221028446, filed on May 18, 2022. The entire contents of the aforementioned application are incorporated herein by reference.

TECHNICAL FIELD

The disclosure herein generally relates to modelling, analysis and simulation of complex systems, and, more particularly, to digital twin based systems and methods for business continuity plan and safe return to workplace.

BACKGROUND

Organizations are struggling to ensure business continuity without compromising on delivery excellence in the face of Covid19 pandemic related uncertainties. The uncertainty exists along multiple dimensions such as virus mutations, infectivity and severity of new mutants, efficacy of vaccines against new mutants, waning of vaccine induced immunity over time, and lockdown/opening-up policies effected by city authorities. Moreover, this uncertainty plays out in a non-uniform manner across nations, states, cities, and even within the cities thus leading to highly heterogeneous evolution of pandemic. While Work from Home (WFH) strategy has served well to meet ever-increasing business demands without compromising on individual health safety, there has been an undeniable reduction in social capital. With Covid19 pandemic showing definite waning trends, organizations are considering the possibility of safe transition from WFH to Work from Office (WFO) or a hybrid mode of operation. An effective strategy needs to score equally well on possibly interfering dimensions such as risk of infection, project delivery, and employee wellness. As large organizations typically have a large number of offices spread across a geography, the problem of arriving at office-specific strategies becomes non-trivial. Moreover, the strategies need to adapt over time to changes that cannot be deduced upfront.

SUMMARY

Embodiments of the present disclosure present technological improvements as solutions to one or more of the above-mentioned technical problems recognized by the inventors in conventional systems.

For example, in one aspect, there is provided a processor implemented method for digital twin based systems and methods for business continuity plan and safe return to workplace. The method comprises receiving, via one or more hardware processors, an input data comprising epidemiological data of a population in one or more locations; modelling, via the one or more hardware processors, an instance of a stock and flow model for each of the one or more locations based on a plurality of employees and one or more offices of an organization associated with the one or more locations to obtain one or more instances of location specific stock and flow models; calculating, by the one or more instances of location specific stock and flow models via the one or more hardware processors, one or more location specific susceptible to exposure (s2e) rates, wherein the susceptible to exposure (s2e) rate of the one or more locations is calculated from a probability of contact and a learnable variable; applying, a statistical decay function via the one or more hardware processors, on the one or more location specific susceptible to exposure (s2e) rates and converting the one or more location specific s2e rates to one or more organization specific s2e rates to obtain one or more organization specific location wise s2e rates, wherein each of the one or more organization specific s2e rates corresponds to a specific location amongst the one or more locations, and wherein the one or more organization specific location wise s2e rates comprises differences in demographic characteristics, health profile related features, and pandemic specific behaviour of the plurality of employees of the organization and the one or more associated dependents; creating, via the one or more hardware processors, at least one of (a) an employee-based digital twin based on (i) the epidemiological data, (ii) the demographic and health profile related features for the plurality of employees of the organization and the one or more associated dependents, (iii) the one or more organization specific location wise s2e rates, and (b) an office-based digital twin based on (i) the epidemiological data, (ii) the demographic and health profile related features for the plurality of employees of the organization and the one or more associated dependents, (iii) an office and infrastructure data, and (iv) the one or more organization specific location wise s2e rates, wherein the employee-based digital twin and the office-based digital twin are created by modeling information pertaining to employees comprising at least an age, a gender, one or more comorbidities, a vaccine status, dependents data, the one or more offices, one or more employee associated project details, one or more desks within one or more offices, and one or more facilities within the one or more offices, wherein the employee-based digital twin comprises a first set of Key Performance Indicators (KPIs) with an associated initial value, and wherein the office-based digital twin comprises a second set of Key Performance Indicators (KPIs) with an associated initial value; identifying an updated value of a corresponding KPI comprised in the at least one of the first set of Key Performance Indicators (KPIs) and the second set of Key Performance Indicators (KPIs) based on a simulation of the at least one of the employee-based digital twin and the office-based digital twin respectively, and wherein the updated value of a corresponding KPI comprised in the at least one of the first set of Key Performance Indicators (KPIs) and the second set of Key Performance Indicators (KPIs) is indicative of infection of one or more employees and dependents being predicted at one or more aggregation levels of the one or more offices of the organization.

In an embodiment, the stock and flow model is modelled based on a Susceptible-Exposed-Infected-Recovered (SEIR) model, and wherein the stock and flow model comprises a plurality of stocks, a plurality of auxiliary variables, a sequential phase of infection and one or more phases of vaccination, in the population modelled by the plurality of stocks, a plurality of flows, that govern the plurality of stocks to and from movement of the population, and a plurality of configuration delays.

In an embodiment, one or more phases of spread of an infection within the population are modelled based on the plurality of stocks, and movement of the population between the plurality of stocks is controlled based on the plurality of flows.

In an embodiment, the plurality of flows comprises a plurality of infection flows and a plurality of vaccination flows.

In an embodiment, a time gap between movement of the population from one stock to another stock among the plurality of stocks is modelled based on the plurality of configuration delays.

In an embodiment, the plurality of stocks is initialized and one or more values required to incorporate the epidemiological data into the plurality of flows are stored based on the plurality of auxiliary variables.

In an embodiment, the learnable variable is configured to tune the probability of contact, and wherein the probability of contact is determined as a ratio of infected population to a total living population by using the probability of contact and the learnable variable.

In an embodiment, the one or more organization specific location wise s2e rates obtained (i) factor in an impedance mismatch prevalent with respect to a specific location, and (ii) refrain from comprising infection information pertaining to one or more employees of the one or more offices and one or more dependents of the one or more employees, accounted in the stock and flow model.

In an embodiment, the step of identifying the updated value for each KPI comprised in the first set of KPIs and the second set of KPIs comprises: creating, the one or more employees and the one or more dependents as a plurality of agents in the agent-based fine-grained model (ABM) comprised in the employee-based digital twin and the office-based digital twin respectively; instantiating, the plurality of agents and an environment of the ABM, using data comprising the epidemiological data, the demographic, project and health profile related features for the plurality of employees of the organization and the one or more associated dependents, the office and infrastructure data and the one or more organization specific location wise s2e rates respectively; assigning, a specific comorbid for the plurality of agents in the ABM, using a probability distribution technique, obtained from a geography specific age wise and gender wise co-morbidity distribution of the data, wherein in the employee-based digital twin and the office-based digital twin, random movement behavior of the one or more employees is modelled and impact of infection due to movement within (i) one or more residences (ii) the one or more offices, and (iii) one or more public places captured using the one or more organization specific location wise s2e rates; simulating the ABM for interaction of the plurality of agents with each other and with the environment according to a specified behavior leading to an infection, wherein during the simulation of the ABM, one or more states and behaviors are modified using one or more interventions applied at one or more time stamps; and identifying the updated value for each KPI comprised in at least one of the first set of KPIs and the second set of KPIs from the simulated ABM, wherein the updated value of the first set of KPIs and the second set of KPIs correspond to one or more infection results reported at the one or more aggregation levels.

In an embodiment, the method comprises validating the simulated ABM based on a convergence level of (i) the ABM and (ii) at least one of the first set of KPIs, and the second set of KPIs, wherein the convergence level of the ABM is based on a total number of simulations required to converge all stochastic functions (n) which is determined by number of trials required on a probabilistic function having a Bernoulli trial (N), and wherein the convergence level of at least one of the first set of KPIs and the second set of KPIs is based on number of simulations required for convergence on stable predictions without significant variances in a mean of results associated with each simulation.

In an embodiment, the first set of KPIs and the second set of KPIs comprise one or more active infected employees, one or more impacted employees whose one or more dependents are infected, aggregative level specific infection, age and gender distributions, change in infection patterns due to employee movement during transition from one location to another location, and possibility of office induced infections, and infections from commute.

In another aspect, there is provided a processor implemented system for digital twin based systems and methods for business continuity plan and safe return to workplace. The system comprises: a memory storing instructions; one or more communication interfaces; and one or more hardware processors coupled to the memory via the one or more communication interfaces, wherein the one or more hardware processors are configured by the instructions to: receive an input data comprising epidemiological data of a population in one or more locations; model an instance of a stock and flow model for each of the one or more locations based on a plurality of employees and one or more offices of an organization associated with the one or more locations to obtain one or more instances of location specific stock and flow models; calculate, by using the one or more instances of location specific stock and flow models, one or more location specific susceptible to exposure (s2e) rates, wherein the susceptible to exposure (s2e) rate of the one or more locations is calculated from a probability of contact and a learnable variable; apply, a statistical decay function, on the one or more location specific susceptible to exposure (s2e) rates and converting the one or more location specific s2e rates to one or more organization specific s2e rates to obtain one or more organization specific location wise s2e rates, wherein each of the one or more organization specific s2e rates corresponds to a specific location amongst the one or more locations, and wherein the one or more organization specific location wise s2e rates comprises differences in demographic characteristics, health profile related features, and pandemic specific behaviour of the plurality of employees of the organization and the one or more associated dependents; create at least one of (a) an employee-based digital twin based on (i) the epidemiological data, (ii) the demographic and health profile related features for the plurality of employees of the organization and the one or more associated dependents, (iii) the one or more organization specific location wise s2e rates, and (b) an office-based digital twin based on (i) the epidemiological data, (ii) the demographic and health profile related features for the plurality of employees of the organization and the one or more associated dependents, (iii) an office and infrastructure data, and (iv) the one or more organization specific location wise s2e rates, wherein the employee-based digital twin and the office-based digital twin are created by modeling information pertaining to employees comprising at least an age, a gender, one or more comorbidities, a vaccine status, dependents data, the one or more offices, one or more employee associated project details, one or more desks within one or more offices, and one or more facilities within the one or more offices, wherein the employee-based digital twin comprises a first set of Key Performance Indicators (KPIs) with an associated initial value, and wherein the office-based digital twin comprises a second set of Key Performance Indicators (KPIs) with an associated initial value; identify an updated value of a corresponding KPI comprised in the at least one of the first set of Key Performance Indicators (KPIs) and the second set of Key Performance Indicators (KPIs) based on a simulation of the at least one of the employee-based digital twin and the office-based digital twin respectively, and wherein the updated value of a corresponding KPI comprised in the at least one of the first set of Key Performance Indicators (KPIs) and the second set of Key Performance Indicators (KPIs) is indicative of infection of one or more employees and dependents being predicted at one or more aggregation levels of the one or more offices of the organization.

In an embodiment, the stock and flow model is modelled based on a Susceptible-Exposed-Infected-Recovered (SEIR) model, and wherein the stock and flow model comprises a plurality of stocks, a plurality of auxiliary variables, a sequential phase of infection and one or more phases of vaccination, in the population modelled by the plurality of stocks, a plurality of flows, that govern the plurality of stocks to and from movement of the population, and a plurality of configuration delays.

In an embodiment, one or more phases of spread of an infection within the population are modelled based on the plurality of stocks, and movement of the population between the plurality of stocks based on the plurality of flows.

In an embodiment, the plurality of flows comprises a plurality of infection flows and a plurality of vaccination flows.

In an embodiment, a time gap between movement of the population from one stock to another stock among the plurality of stocks is modelled based on the plurality of configuration delays.

In an embodiment, the plurality of stocks is initialized and one or more values required to incorporate the epidemiological data into the plurality of flows are stored based on the plurality of auxiliary variables.

In an embodiment, the learnable variable is configured to tune the probability of contact, and wherein the probability of contact is determined as a ratio of infected population to a total living population by using the probability of contact and the learnable variable.

In an embodiment, the one or more organization specific location wise s2e rates obtained (i) factor in an impedance mismatch prevalent with respect to a specific location, and (ii) refrain from comprising infection information pertaining to one or more employees of the one or more offices and one or more dependents of the one or more employees, accounted in the stock and flow model.

In an embodiment, the updated value for each KPI comprised in the first set of KPIs and the second set of KPIs is identified by creating, the one or more employees and the one or more dependents as a plurality of agents in the agent-based fine-grained model (ABM) comprised in the employee-based digital twin and the office-based digital twin respectively; instantiating, the plurality of agents and an environment of the ABM, using data comprising the epidemiological data, the demographic, project and health profile related features for the plurality of employees of the organization and the one or more associated dependents, the office and infrastructure data and the one or more organization specific location wise s2e rates respectively; assigning, a specific comorbid for the plurality of agents in the ABM, using a probability distribution technique, obtained from a geography specific age wise and gender wise co-morbidity distribution of the data, wherein in the employee-based digital twin and the office-based digital twin, random movement behavior of the one or more employees is modelled and impact of infection due to movement within (i) one or more residences (ii) the one or more offices, and (iii) one or more public places captured using the one or more organization specific location wise s2e rates; simulating the ABM for interaction of the plurality of agents with each other and with the environment according to a specified behavior leading to an infection, wherein during the simulation of the ABM, one or more states and behaviors are modified using one or more interventions applied at one or more time stamps; and identifying the updated value for each KPI comprised in at least one of the first set of KPIs and the second set of KPIs from the simulated ABM, wherein the updated value of the first set of KPIs and the second set of KPIs correspond to one or more infection results reported at the one or more aggregation levels.

In an embodiment, the one or more hardware processors are configured by the instructions to validate the simulated ABM based on a convergence level of (i) the ABM and (ii) at least one of the first set of KPIs, and the second set of KPIs, wherein the convergence level of the ABM is based on a total number of simulations required to converge all stochastic functions (n) which is determined by number of trials required on a probabilistic function having a Bernoulli trial (N), and wherein the convergence level of at least one of the first set of KPIs and the second set of KPIs is based on number of simulations required for convergence on stable predictions without significant variances in a mean of results associated with each simulation.

In an embodiment, the first set of KPIs and the second set of KPIs comprise one or more active infected employees, one or more impacted employees whose one or more dependents are infected, aggregative level specific infection, age and gender distributions, change in infection patterns due to employee movement during transition from one location to another location, and possibility of office induced infections, and infections from commute.

In yet another aspect, there are provided one or more non-transitory machine-readable information storage mediums comprising one or more instructions which when executed by one or more hardware processors cause a method for digital twin based systems and methods for business continuity plan and safe return to workplace by receiving an input data comprising epidemiological data of a population in one or more locations; modelling an instance of a stock and flow model for each of the one or more locations based on a plurality of employees and one or more offices of an organization associated with the one or more locations to obtain one or more instances of location specific stock and flow models; calculating, by the one or more instances of location specific stock and flow models, one or more location specific susceptible to exposure (s2e) rates, wherein the susceptible to exposure (s2e) rate of the one or more locations is calculated from a probability of contact and a learnable variable; applying, a statistical decay function, on the one or more location specific susceptible to exposure (s2e) rates and converting the one or more location specific s2e rates to one or more organization specific s2e rates to obtain one or more organization specific location wise s2e rates, wherein each of the one or more organization specific s2e rates corresponds to a specific location amongst the one or more locations, and wherein the one or more organization specific location wise s2e rates comprises differences in demographic characteristics, health profile related features, and pandemic specific behaviour of the plurality of employees of the organization and the one or more associated dependents; creating at least one of (a) an employee-based digital twin based on (i) the epidemiological data, (ii) the demographic and health profile related features for the plurality of employees of the organization and the one or more associated dependents, (iii) the one or more organization specific location wise s2e rates, and (b) an office-based digital twin based on (i) the epidemiological data, (ii) the demographic and health profile related features for the plurality of employees of the organization and the one or more associated dependents, (iii) an office and infrastructure data, and (iv) the one or more organization specific location wise s2e rates, wherein the employee-based digital twin and the office-based digital twin are created by modeling information pertaining to employees comprising at least an age, a gender, one or more comorbidities, a vaccine status, dependents data, the one or more offices, one or more employee associated project details, one or more desks within one or more offices, and one or more facilities within the one or more offices, wherein the employee-based digital twin comprises a first set of Key Performance Indicators (KPIs) with an associated initial value, and wherein the office-based digital twin comprises a second set of Key Performance Indicators (KPIs) with an associated initial value; identifying an updated value of a corresponding KPI comprised in the at least one of the first set of Key Performance Indicators (KPIs) and the second set of Key Performance Indicators (KPIs) based on a simulation of the at least one of the employee-based digital twin and the office-based digital twin respectively, and wherein the updated value of a corresponding KPI comprised in the at least one of the first set of Key Performance Indicators (KPIs) and the second set of Key Performance Indicators (KPIs) is indicative of infection of one or more employees and dependents being predicted at one or more aggregation levels of the one or more offices of the organization.

In an embodiment, the stock and flow model is modelled based on a Susceptible-Exposed-Infected-Recovered (SEIR) model, and wherein the stock and flow model comprises a plurality of stocks, a plurality of auxiliary variables, a sequential phase of infection and one or more phases of vaccination, in the population modelled by the plurality of stocks, a plurality of flows, that govern the plurality of stocks to and from movement of the population, and a plurality of configuration delays.

In an embodiment, one or more phases of spread of an infection within the population are modelled based on the plurality of stocks, and movement of the population between the plurality of stocks is controlled based on the plurality of flows.

In an embodiment, the plurality of flows comprises a plurality of infection flows and a plurality of vaccination flows.

In an embodiment, a time gap between movement of the population from one stock to another stock among the plurality of stocks is modelled based on the plurality of configuration delays.

In an embodiment, the plurality of stocks is initialized and one or more values required to incorporate the epidemiological data into the plurality of flows are stored based on the plurality of auxiliary variables.

In an embodiment, the learnable variable is configured to tune the probability of contact, and wherein the probability of contact is determined as a ratio of infected population to a total living population by using the probability of contact and the learnable variable.

In an embodiment, the one or more organization specific location wise s2e rates obtained (i) factor in an impedance mismatch prevalent with respect to a specific location, and (ii) refrain from comprising infection information pertaining to one or more employees of the one or more offices and one or more dependents of the one or more employees, accounted in the stock and flow model.

In an embodiment, the step of identifying the updated value for each KPI comprised in the first set of KPIs and the second set of KPIs comprises: creating, the one or more employees and the one or more dependents as a plurality of agents in the agent-based fine-grained model (ABM) comprised in the employee-based digital twin and the office-based digital twin respectively; instantiating, the plurality of agents and an environment of the ABM, using data comprising the epidemiological data, the demographic, project and health profile related features for the plurality of employees of the organization and the one or more associated dependents, the office and infrastructure data and the one or more organization specific location wise s2e rates respectively; assigning, a specific comorbid for the plurality of agents in the ABM, using a probability distribution technique, obtained from a geography specific age wise and gender wise co-morbidity distribution of the data, wherein in the employee-based digital twin and the office-based digital twin, random movement behavior of the one or more employees is modelled and impact of infection due to movement within (i) one or more residences (ii) the one or more offices, and (iii) one or more public places captured using the one or more organization specific location wise s2e rates; simulating the ABM for interaction of the plurality of agents with each other and with the environment according to a specified behavior leading to an infection, wherein during the simulation of the ABM, one or more states and behaviors are modified using one or more interventions applied at one or more time stamps; and identifying the updated value for each KPI comprised in at least one of the first set of KPIs and the second set of KPIs from the simulated ABM, wherein the updated value of the first set of KPIs and the second set of KPIs correspond to one or more infection results reported at the one or more aggregation levels.

In an embodiment, the method comprises validating the simulated ABM based on a convergence level of (i) the ABM and (ii) at least one of the first set of KPIs, and the second set of KPIs, wherein the convergence level of the ABM is based on a total number of simulations required to converge all stochastic functions (n) which is determined by number of trials required on a probabilistic function having a Bernoulli trial (N), and wherein the convergence level of at least one of the first set of KPIs and the second set of KPIs is based on number of simulations required for convergence on stable predictions without significant variances in a mean of results associated with each simulation.

In an embodiment, the first set of KPIs and the second set of KPIs comprise one or more active infected employees, one or more impacted employees whose one or more dependents are infected, aggregative level specific infection, age and gender distributions, change in infection patterns due to employee movement during transition from one location to another location, and possibility of office induced infections, and infections from commute.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 3A through 3B depicts an exemplary flow chart illustrating a digital twin based method for business continuity plan and safe return to workplace, using the systems of FIGS. 1-2, in accordance with an embodiment of the present disclosure.

DETAILED DESCRIPTION

Figure 1:
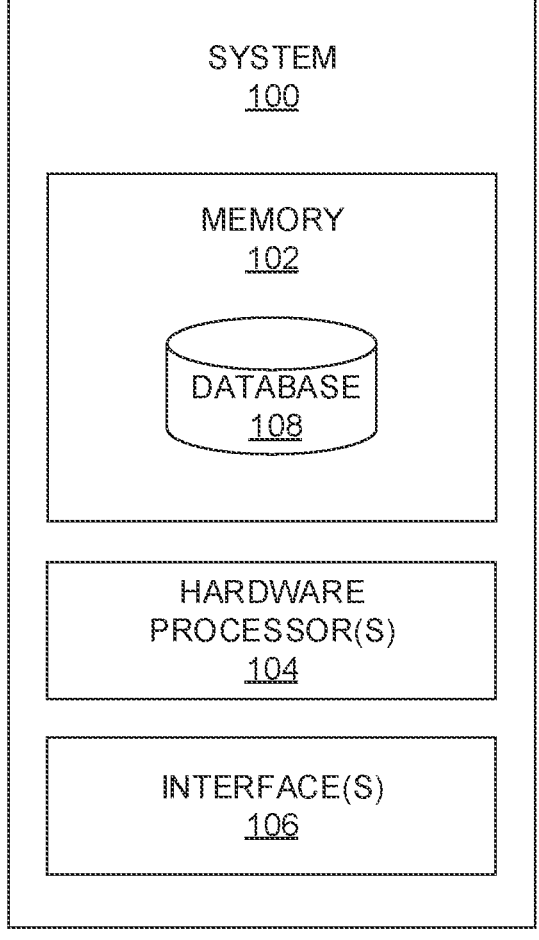
FIG. 1 depicts an exemplary digital twin based system for business continuity plan and safe return to workplace, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The Covid19 pandemic has significantly impacted public health and economy globally since 2019 and the situation is still not under control. The first wave of Covid19 infection began worldwide in early 2020 and lasted almost for six months. Since then, multiple waves have been witnessed by different part of the world at different times.

The wave that started in India in March 2021 due Delta variant has rapidly turned into severe and taken a serious toll on public health for months across the world. Now, another surge due to Omicron variant has been witnessed and there is no clue about how situation tends to unfold in the coming days. Large organizations are struggling to ensure business commitments due to these covid19 pandemic related uncertainties. Most of the time they are uncertain about when and who are going to be unavailable from work due to Covid19 infection or what types of interventions are going to be imposed by government and local authorities. Moreover, employees take leave when their family members are infected. The question that large organizations are keen to understand is the possible disruption of business as-usual activities due to Covid pandemic related causes, such as employee unavailability. Precise understanding about such disruptions with tentative time frame helps to refine business continuity plan (BCP) and ensure delivery excellence. However, such predictions for large organizations are extremely complex as such predictions involve precise understanding of epidemiological progression of Covid19 variants and their characteristics, vaccination status of employees, job profile and demographic variations of employees, covid appropriate behavior followed by employees and their family members, what are the precautions taken by local authorities where employees are located, and many more. Large size of the organization leads to additional complexity and computing burden. For that matter, organizations have large number of employees who are living with number of family members across 1800+ odd cities from different parts of India or across world.

Understanding disruptions of business as-usual activities due to covid19 pandemic related causes is not only complex but beyond human cognitive ability when a large organization is actively exploring the possibility to return its workforce to office, i.e., transition from work from home (WFH) to work from office (WFO), in a safe way. For example, Organizations operating in a specific location has to consider safely returning its workforce to its respective offices across branches possibly in a phased manner over the months when situation is permissible. The questions that require precise and critical evaluation are: when is the appropriate time to allow their employees to work from office?What would be the appropriate occupancy? What would be the change in infection trend when certain percentage of employees start working from office? Moreover, the organizations with strong belief in equity, empathy and employee wellbeing consider several other questions, such as—Are there any additional risk of infection for those who are coming to office with respect to those who are continuing WFH? Can such risks be reduced by introducing appropriate interventions within offices? Are employees who are having unvaccinated young children at home being safe guarded? or any inconvenience is created to those employees with toddlers who need care giving while schools and day cares are closed or unsafe? Such analysis requires precise understanding of demographic factors of those who are returning to office, their vaccination status, infection statues, locality of office, office building layout, desk layout, various facilities within office building, allowed employee occupancy, interventions adopted within office buildings, details about office staff, etc. Moreover, all such details need to be correlated with the characteristics of the dominant variants of concern, the infection situation of the cities where offices are located, and interventions imposed by governments and city administrations for precise analysis.

Most of the large organizations have adopted a simplified method to estimate infection trend of their employees by computing proportionate number from city specific infection trends of their office locations. Such methods are grossly approximated and not cognizant of organization specific heterogeneity, i.e., demographic heterogeneity of the employees, comorbidity, cities where employees are staying and their infection trends, social factors (e.g., societies where employees stay), vaccine coverage, affinity to follow covid appropriate behavior, availability of heath care systems, and office specific information. Therefore, they are neither accurate nor capable of addressing equity, empathy, and employee wellbeing aspects.

Embodiments of the present disclosure provide digital twin based systems and methods for business continuity plan and safe return to workplace. More specifically, the present disclosure adopted a simulation-based data-driven evidence-backed approach that has the Digital Twin at its core. The Digital Twin of an organization as implemented by the present disclosure captures details pertaining to virus (the active mutant strains and their epidemiological characteristics such as infection transmissibility, extent of severity, and vaccine escape), individualistic characteristics of employees and their dependents (i.e., age, gender, comorbidity, vaccination status, typical movement patterns, adherence to Covid Appropriate Behaviors (CAB), etc.), offices (size, layout, workspace per person, utility spaces etc.), locations (e.g., cities) of the employees and offices, and various pandemic control measures that are in effect and need to be explored.

To capture these aspects of interest with varying granularity in an analyzable form, a hybrid modelling and simulation approach is implemented by the present disclosure that combines fine-grained actor/agent model and coarse-grained stock-and-flow model. The system and method of the present disclosure further leverage past macro-level data pertaining to pandemic evolution of relevant cities, states, and countries to make available information amenable for collective analysis.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 depicts an exemplary digital twin based system 100 for business continuity plan and safe return to workplace, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information such as epidemiological data of a population in one or more locations. The database 108 further comprises a plurality of employees and offices of an organization associated with the one or more locations, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
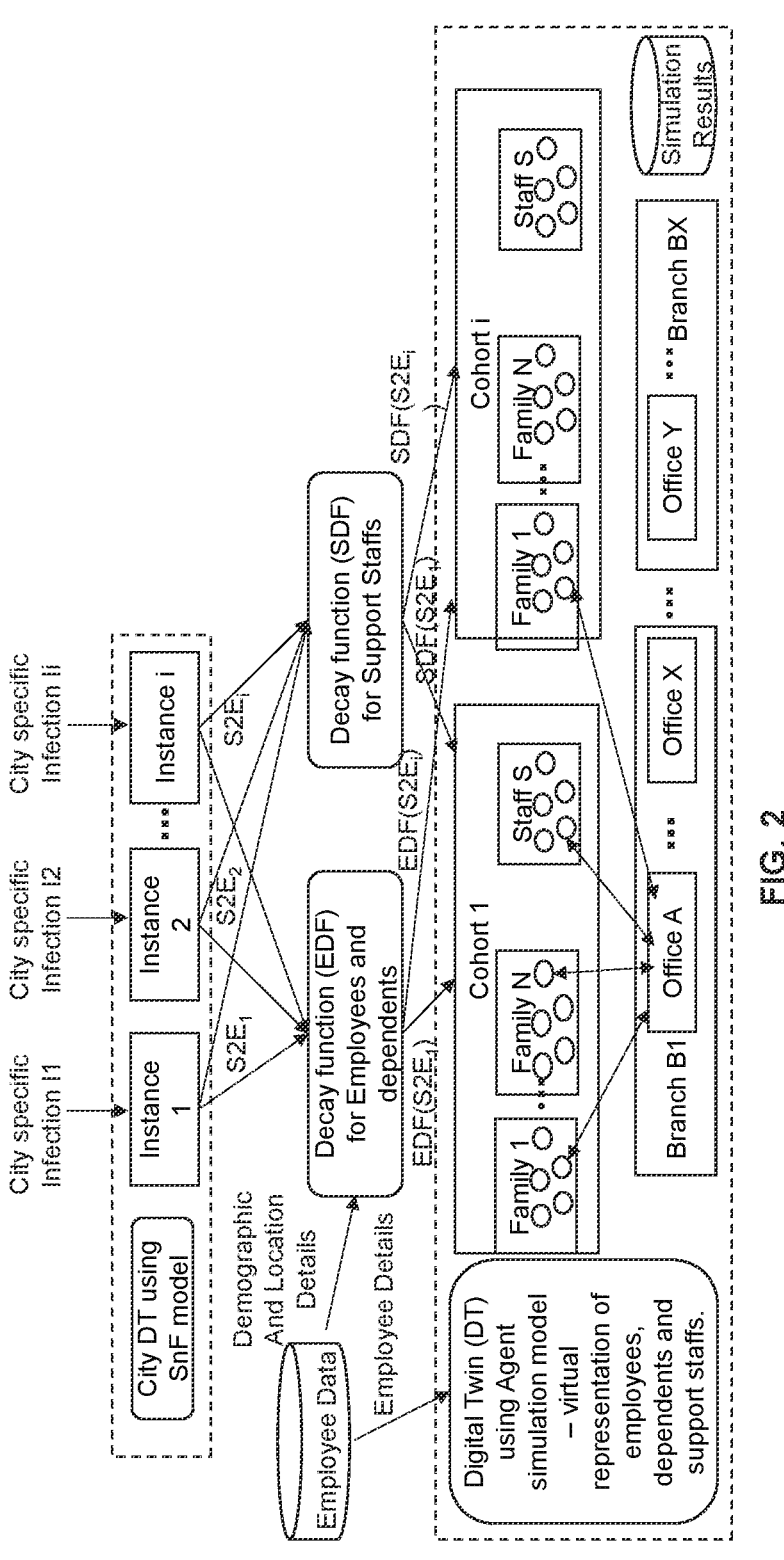
FIG. 2 depicts an exemplary high level block diagram of the digital twin based system for business continuity plan and safe return to workplace, in accordance with an embodiment of the present disclosure.

FIG. 2 depicts an exemplary high level block diagram of the digital twin based system 100 for business continuity plan and safe return to workplace, in accordance with an embodiment of the present disclosure. Functions of the components of the system 100 in FIG. 2 are explained with reference to the process steps depicted in FIGS. 3A-3B.

FIGS. 3A through 3B, depict an exemplary flow chart illustrating a digital twin based method for business continuity plan and safe return to workplace, using the systems of FIGS. 1-2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIG. 2, and the flow diagram as depicted in FIG. 3A-3B.

At step 202 of the method of the present disclosure, the one or more hardware processors 104 receive an input data comprising epidemiological data of a population in one or more locations. For instance, the epidemiological data corresponds to infection details. In an embodiment, the one or more locations may include but are not limited to rural and urban areas (including suburbs) such as villages, towns, cities, areas in the towns and/or cities, states, countries, and the like. Location specific epidemiological data includes but is not limited to seroprevalence rate in that location and the vaccination rate. The epidemiological data comprises, but is not limited to, information obtained from one or more published researches such as (i) delay in the transition between the states (Susceptible, exposed, infected, critical, recovered, deceased) of infection, (ii) a probability of infected and critical people to transition to critical and deceased state respectively, (iii) rate at which immune people lose their immunity and the time it takes, (iv) reduction in transitioning rate from infected to critical and from critical to deceased after one or more doses of vaccine, (v) Different infectivity and severity of the different virus variants, and (vi) data to determine severity of infection based on comorbidity and age of individual and vaccination status.

At step 204 of the method of the present disclosure, the one or more hardware processors 104 model an instance of a stock and flow model for each of the one or more locations based on a plurality of employees and one or more offices of an organization associated with the one or more locations to obtain one or more instances of location specific stock and flow models. In an embodiment, the stock and flow model is modelled based on a Susceptible-Exposed-Infected-Recovered (SEIR) model. In an embodiment, the stock and flow model comprises a plurality of stocks, a plurality of auxiliary variables, a sequential phase of infection and one or more phases of vaccination, in the population modelled by the plurality of stocks, a plurality of flows, that govern movement of the population to and from the plurality of stocks, and a plurality of configuration delays. Inherently, stock and flow models use differential equations—the flow variables are integrated to obtain the net change in a stock (or conversely, the rate of change of a stock is determined by the flow). One or more phases of spread of an infection within the population are modelled based on the plurality of stocks, and movement of the population between the plurality of stocks is controlled based on the plurality of flows. In other words, one or more phases of spread of an infection within the population are modelled using the plurality of stocks, and movement of the population between the plurality of stocks is controlled using the plurality of flows. The stocks make up the cohorts which represent the various infection states as mentioned above. This is extended to also incorporate the vaccination states into the stock and flow model. The following stocks are obtained: Susceptible, Exposed, Infected, Critical, Deceased, Recovered, Eligible for Vaccination, Vaccinated and waiting for further doses. So, the stocks model the sequential phases of infection and phases of vaccination.

In an embodiment, the plurality of flows comprises a plurality of infection flows and a plurality of vaccination flows. The information from the input has been used to develop equations that govern the movement of population between stocks. For example: a 'probability of contact' is considered to determine how many susceptible people will be exposed to the virus within the population. This is calculated as the ratio of infected population (detected as well as undetected contributing to infection spread) to total living population (net population minus deceased population). This probability alone does not entirely specify the movement from Susceptible to Exposed. Hence, it is multiplied with a multiplier $\alpha$, where $\alpha$ is a multiplier (learnable variable) used to tune the probability of contact. Multiplying these two together with the 'Susceptible' stock gives the Susceptible to Exposed Flow. Similarly, the equations for other infection and vaccination flows are also developed (either by system or based on user inputs or by user(s)). In other words, learnable variable is configured to tune the probability of contact, and the probability of contact is determined as a ratio of infected population to a total living population by using the probability of contact and the learnable variable.

In an embodiment, a time gap between movement of the population from one stock to another stock amongst the plurality of stocks is modelled based on the plurality of configuration delays (also referred as configuration delays and interchangeably used herein). More specifically, the time gap between movement of the population from one stock to another stock amongst the plurality of stocks is modelled using the plurality of configuration delays. In other words, some flows also incorporate a transition delay which reflects the natural delay occurring in transition between the various states of infection. So, the configuration delays are used to model a time gap between movement of the population from one stock to another stock.

In an embodiment, the plurality of stocks is initialized and one or more values required to incorporate the epidemiological data into the plurality of flows are stored based on the plurality of auxiliary variables. More specifically, the plurality of stocks is initialized and one or more values required to incorporate the epidemiological data into the plurality of flows are stored using the plurality of auxiliary variables. In other words, some variables do not identify as either stock or flow but are still required for the following: initializing the stocks, holding values which are required to incorporate the epidemiological characteristics into the flows (for e.g., Probability of transitioning from Infected to Critical State), hold intermediate values (for e.g., Probability of Contact).

All these put together form stock and flow model of a location (e.g., say city). Now this coarse-grained model can be used to predict the exposure rate (Susceptible to Exposed, or s2e) for a given city.

Referring to steps of FIG. 3, At step 206 of the method of the present disclosure, the one or more hardware processors 104 calculate, by using the one or more instances of location specific stock and flow models, one or more location specific susceptible to exposure (s2e) rates, wherein the susceptible to exposure (s2e) rate of the one or more locations (e.g., wards, villages, town, cities, states, and so on) is calculated from a probability of contact and a learnable variable. At step 208 of the method of the present disclosure, the one or more hardware processors 104 apply, a statistical decay function via the one or more hardware processors, on the one or more location specific susceptible to exposure (s2e) rate and converting the one or more location specific s2e rate to one or more organization specific s2e rates to obtain one or more organization specific location wise s2e rates. Each of the one or more organization specific s2e rates corresponds to a specific location amongst the one or more locations. In an embodiment, the one or more organization specific location wise s2e rates comprise differences in demographic characteristics, health profile related features, and pandemic specific behaviour of the plurality of employees of the organization and the one or more associated dependents. Each s2e rate is then processed using the decay function on each day in simulation. This decay function serves 2 purposes: (i) to factor in the impedance mismatch prevalent with respect to the city (as infection trajectory goes exponential, Covid Appropriate Behavior (CAB) of employees will be high resulting in lesser infection within organization's Individuals compared to the rest of the city) and (ii) to factor out the additional infections from input s2e rate. (s2e rate which will be used by an employee digital twin should only account for community caused infections as home and office infection will be simulated by an agent-based model (ABM). But s2e coming from CityDT (city digital twin also referred as stock and flow model of a location and interchangeably used herein) constitutes total infections including home and office infection). Parameters of the decay function are fitted by experimentation-validation loop. In other words, the one or more organization specific location wise s2e rates obtained (i) factor in an impedance mismatch prevalent with respect to a specific location, and (ii) refrain from comprising infection information pertaining to one or more employees of the one or more offices and one or more dependents of the one or more employees, accounted in the stock and flow model.

Figure 4A:
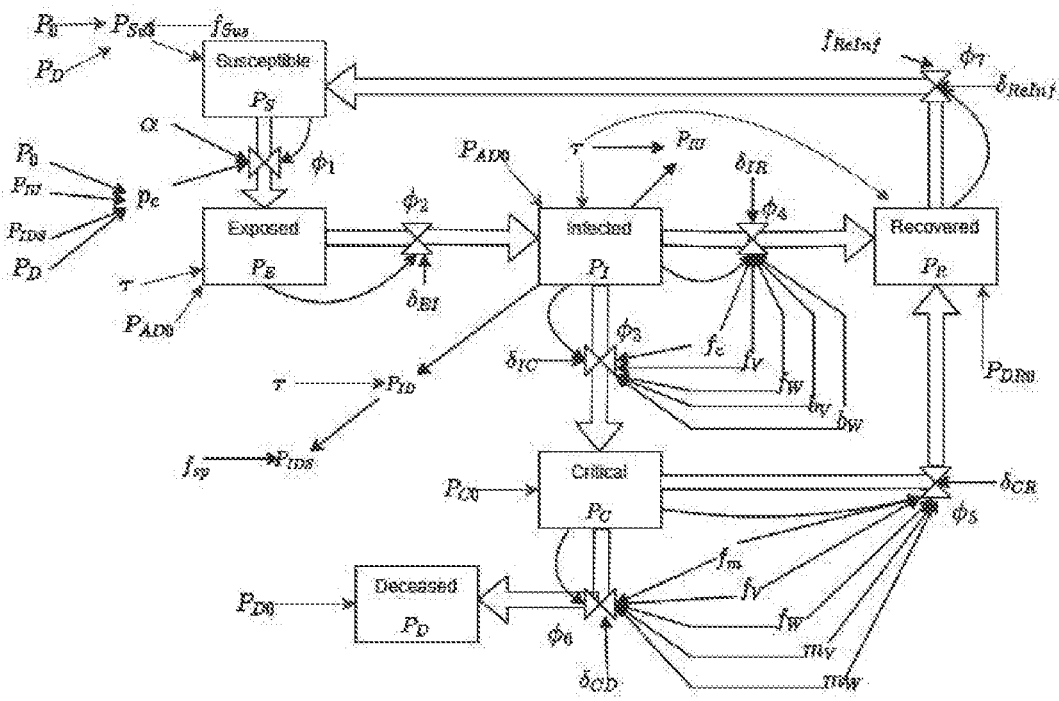
FIGS. 4A through 4B depict a relevant part of Stock and Flow model for a locality of interest (or also referred as location of interest), in accordance with an embodiment of the present disclosure.
Figure 4B:
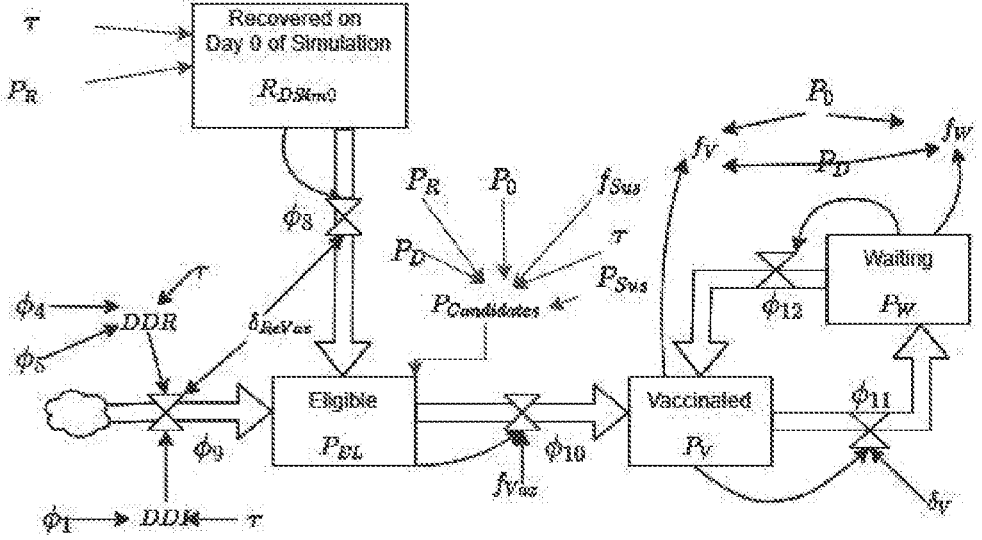

The above steps 204 till 208 are better understood by way of following description. An example of modeling instance of the stock and flow model for each city is depicted in FIG. 2. Such example of city as a location of interest shall not be construed as limiting the scope of the present disclosure. FIGS. 4A through 4B, with reference to FIGS. 1 through 3, depict a relevant part of Stock and Flow (SnF) model for a locality of interest (or also referred as location of interest), in accordance with an embodiment of the present disclosure.

The SnF model is for understanding the possibility of locality induced infections. A person getting exposed to Covid19 virus from their respective locality on a given day largely depends on two factors: a) movement of the individual and other characteristics such as adherence to CAB and compliance of local protocols, and b) current rate at which the locality is exposed to Covid19 virus, i.e., Susceptible to Exposed (s2e) rate. This rate may vary from locality to locality and computing it for a locality requires precise information about—a) number of people in the locality that are susceptible (serosurvey reports provides only an indicative value), b) number of actively infected individuals (existing Covid19 dashboards indicates detected active cases, which is a subset of actual active cases, and c) possible contact rate of individual. Comprehending future trend of s2e rate of a locality requires consideration of additional influencing factors that include—dominant variants of concern and their characteristics, non-pharmaceutical interventions, CAB. Here, knowing precise distribution of dominant variants in a locality is not possible and possible noncompliance of interventions by the residents can only be vaguely estimated from anecdotal evidence. The system 100 models locality of interest using a configurable coarse-grained stock and flow (SnF) model to understand the overall infection spread dynamics in a locality and derive the trend on s2e rates. Conceptually, SnF model extends established compartmental model, precisely SEIR (e.g., refer He et al. 2020)/SEIRD (Korolev 2021) model, wherein the system 100 has considered six sequential cohorts representing infection phases, namely $P_S$ (Susceptible), $P_E$ (Exposed), $P_I$ (Infected), $P_C$ (Critical), $P_R$ (Recovered) & $P_D$ (Deceased), and an additional feedback loop from $P_R$ (Recovered) to $P_S$ (Susceptible) to represent loss of immunity and possibility of reinfection. Cohorts are represented using Stocks, and movements of aggregated number of people from one cohort to another are represented using Flows (indicated with 49) as shown in FIGS. 4A through 4B. Flows are mostly governed by a set of factors, which are represented as auxiliary variables, and time delays (indicated using $\delta_i$). Stocks, flows, auxiliary variables and time delays are summarized in below Table 1. As shown in FIGS. 4A through 4B and described in Table 1, flows $\phi_3$ ($P_I$ to $P_C$), $\phi_4$ ($P_I$ to $P_R$), $\phi_5$ ($P_C$ to $P_R$), and $\phi_6$ ($P_C$ to $P_D$) depend on vaccine adoption and vaccine efficacy.

TABLE 1

| No. | STOCK | INITIAL VALUE | EQUATION |
|-----|-------|---------------|----------|
| | | I STOCKS AND ASSOCIATED DIFFERENTIAL EQUATIONS | |
| 1. | $P_S$ (Susceptible) | $P_{Sus} = (P_0 - P_D) \times f_{Sus}$ | $\dfrac{dP_S}{dt} = \phi_7 - \phi_1$ |
| 2. | $P_E$ (Exposed) | $P_{AD0}$ (Initial Detected Active Cases) $\div$ T | $\dfrac{dP_E}{dt} = \phi_1 - \phi_2$ |
| 3. | $P_I$ (Infected) | $P_{AD0} \div$ T | $\dfrac{dP_I}{dt} = \phi_2 - \phi_3 - \phi_4$ |
| 4. | $P_R$ (Recovered) | $P_{DR0}$ (Initial Detected Recoveries) $\div$ T | $\dfrac{dP_R}{dt} = \phi_4 + \phi_5 - \phi_7$ |
| 5. | $P_C$ (Critical) | $P_{C0}$ (Initial Reported Critical Cases) | $\dfrac{dP_C}{dt} = \phi_3 - \phi_5 - \phi_6$ |
| 6. | $P_D$ (Deceased) | $P_{D0}$ (Initial Reported Deceased Count) | $\dfrac{dP_D}{dt} = \phi_6$ |
| 7. | $R_{DSim0}$ (Recovered on Day 0 of Simulation) | $P_R \times$ T | $\dfrac{dR_{DSim0}}{dt} = -\phi_8$ |
| 8. | $P_{EL}$ (Eligible) | $P_{Candidates} = (((P_0 - P_D) \times (1 - f_{Sus})) - (P_R \times \tau)) + P_{Sus}$ | $\dfrac{dP_{EL}}{dt} = \phi_8 + \phi_9 - \phi_{10}$ |
| 9. | $P_V$ (Vaccinated) | 0 | $\dfrac{dP_V}{dt} = \phi_{10} + \phi_{12} - \phi_{11}$ |
| 10. | $P_W$ (Waiting) | 0 | $\dfrac{dP_W}{dt} = \phi_{11} - \phi_{12}$ |

| | II FLOWS |
|--|----------|
| 11. | $\phi_1$(Susceptible to Exposed) $= P_S \times \alpha \times p_c$ |
| 12. | $\phi_2$(Exposed to Infected) $= P_E \div \delta_{EI}$ |
| 13. | $\phi_3$(Infected to Critical) $= (P_I \times f_c \times (f_V \times (1 - b_V) + f_W \times (1 - b_W) + (1 - f_V - f_W))) \div \delta_{IC}$ |
| 14. | $\phi_4$(Infected to Recovered) $= (P_I \times (1 - f_c) \times (f_V \times (1 - (1 - b_V) \times f_c) + f_W \times (1 - (1 - b_W) \times f_c) + (1 - f_V - f_W) \times (1 - f_c))) \div \delta_{IR}$ |
| 15. | $\phi_5$(Critical to Recovered) $= (P_C \times (1 - f_m) \times (f_V \times (1 - (1 - m_V) \times f_m) + f_W \times (1 - (1 - m_W) \times f_m) + (1 - f_V - f_W) \times (1 - f_m))) \div \delta_{CR}$ |
| 16. | $\phi_6$(Critical to Deceased) $= (P_C \times f_m \times (f_V \times (1 - m_V) + f_W + (1 - m_W) + (1 - f_V - f_W))) \div \delta_{CD}$ |
| 17. | $\phi_7$(Reinfection OR Recovered to Susceptible) $= (P_R \times f_{ReInf}) \div \delta_{ReInf}$ |
| 18. | $\phi_8$(Recovered to Eligible) $= R_{DSim0} \div \delta_{ReVax}$ |
| 19. | $\phi_9$(Adds or Removes Recoveries or Infections respectively) $= (DDR \div \delta_{ReVax}) - DDI$ |
| 20. | $\phi_{10}$(Eligible to Vaccinated) $= P_{EL} \times f_{Vax}$ |
| 21. | $\phi_{11}$(Vaccinated to Waiting) $= P_V \div \delta_V$ |
| 22. | $\phi_{12}$(Waiting to Vaccinated) $= P_W$ |
| | III AUXILLARY VARIABLES |
| 23. | $P_0 =$ Net Initial Population |
| 24. | $f_{Sus} =$ Fraction Susceptible |

TABLE 1-continued

| No. | STOCK | INITIAL VALUE | EQUATION |
|---|---|---|---|
| 25. | $p_c$(Probability of Contact) = $(P_{IU} + P_{IDS}) \div (P_0 - P_D)$ | | |
| 26. | s2e (Exposure Rate) = $\alpha \times p_c = \phi_1 \div P_S$ | | |
| 27. | $\tau$ = Testing Uptake | | |
| 28. | $f_{sp}$ = Fraction of Detected Infected Spreaders | | |
| 29. | $P_{ID}$(Infected Detected) = $P_I \times \tau$ | | |
| 30 | $P_{IU}$(Infected Undetected) = $P_I \times (1 - \tau)$ | | |
| 31. | $P_{IDS}$(Infected Detected Spreader) = $P_{ID} \times f_{sp}$ | | |
| 32. | $f_{ReInf}$ = Reinfection Rate | | |
| 33. | DDI (Daily Detected Infections) = $\phi_1 \times \tau$ | | |
| 34. | DDR (Daily Detected Recoveries) = $(\phi_4 + \phi_S) \times \tau$ | | |
| 35. | $f_V$(Fraction Vaccinated) = $P_V \div (P_0 - P_D)$ | | |
| 36. | $f_W$(Fraction Waiting) = $P_W \div (P_0 - P_D)$ | | |
| 37. | $f_c$ = Critical Rate; $f_m$ = Mortality Rate | | |
| 38. | $f_{Vax}$ = Rate of Vaccination | | |
| 39. | $b_V$ = Reduction in Critical Rate after recent Vaccination | | |
| 40. | $b_W$ = Reduction in Critical Rate after some delay following Vaccination | | |
| 41. | $m_V$ = Reduction in Mortality Rate after recent Vaccination | | |
| 42. | $m_W$ = Reduction in Mortality Rate after some delay following Vaccination | | |
| | | IV DELAYS | |
| 43. | $\delta_{EI}$(Exposed to Infected) | | |
| 44. | $\delta_{IR}$(Infected to Recovered) | | |
| 45. | $\delta_{IC}$(Infected to Critical) | | |
| 46. | $\delta_{CR}$(Critical to Recovered) | | |
| 47. | $\delta_{CD}$(Critical to Deceased) | | |
| 48. | $\delta_{ReInf}$(Reinfection) | | |
| 49. | $\delta_{ReVax}$(Recovery to Vaccination) | | |
| 50. | $\delta_V$(Between Vaccination Doses) | | |

The system 100 comprehends vaccine (and booster dose) adoption and its impact on infection dynamics using a simplistic interconnected SnF model. It contains three stocks: $P_{EL}$ (Eligible) (for eligible population), $P_V$ (vaccinated population) and $P_W$ (population who are waiting for next dose) and infers the proportion of population in a locality that—a) is vaccinated recently and possibly has high vaccine induced immunity ($f_V$), and b) was vaccinated long back and possibly has less vaccine induced immunity ($f_W$). Term $P_C$ is the probability of coming in contact with infected people (the ratio of infected people contributing to infection spread, to the total living population) and parameter $\alpha$ is a multiplier (also referred as a learnable variable) that is used to tune this probability. To derive s2e rate of a locality (i.e., city, state, or country), the following four-step process is implemented by the present disclosure:

(a) SnF model is first contextualized using locality specific net initial population ($P_C$), reported critical cases ($P_{CO}$), reported deceased count ($P_{DO}$), detected active cases ($P_{ADO}$), detected recoveries ($P_{DRO}$), and tentative susceptible percentage ($f_{Sus}$) from census records, government dashboards, authentic media bulletins, and published sero-surveys.

(b) Estimate parameter $\alpha$ by simulating SnF model with different α values and comparing simulated trends of detected infected cases ($P_I$), detected recovered cases ($P_R$), critical cases ($P_C$) and number of deceased ($P_D$) with the actual trends.

(c) Adjust α for prospective future scenarios, such as best-case scenario, scenario for complete movement relaxation, emergence of new variant with higher infectivity than known variants.

(d) Finally, the s2e rates are computed for all possible scenarios using s2e equation defined in equation 26 of Table 1.

This process is repeated for all locations wherein where employees and offices are located. However, this s2e rate provides an aggregated estimation about locality specific trend at which common population is getting exposed to Covid19 virus. A transformation function (also referred as decay function and interchangeably used herein) TFOrg to introduce organization specific movement requirement and socio-economic differences from rest of the locality. Two categories of employees were observed: a) employees who have the provision to avoid contact if required (e.g., employees from IT organizations)—essentially job profiles that do not demand high movement, can use online shopping for most of their needs, can afford to stay in modular household, and b) employees who do not have such provision, i.e., not economically strong enough to afford modular residences, their job profile needs extensive contacts with people, and so on. Former category often isolated themselves from rest of the city when there is a surge in infection. Relationship is defined as follows:

TFOrg=S2ERate$(1-\text{decayRate})^x$, where decay rate is associated with the infectivity/panic factor of the dominant variants in the locality and x is typically 5-7 days (a weekly update). Historical infection data of employees was used by the system to fine tune this transformation function.

Referring to steps of FIG. 3, At step 210 of the method of the present disclosure, the one or more hardware processors 104 create at least one of (a) an employee-based digital twin based on (i) the epidemiological data, (ii) a demographic and health profile related features for the plurality of employees of the organization and the one or more associated dependents, (iii) the one or more organization specific location wise s2e rates and (b) an office-based digital twin based on (i) the epidemiological data, (ii) the demographic and health profile related features for the plurality of employees of the organization and the one or more associated dependents, (iii) an office and infrastructure data, and (iv) the one or more organization specific location wise s2e rates.

At step 212 of the method of the present disclosure, the one or more hardware processors 104 identify an updated value of a corresponding KPI comprised in the at least one of the first set of Key Performance Indicators (KPIs) and the second set of Key Performance Indicators (KPIs) based on a simulation of the at least one of the employee-based digital twin and the office-based digital twin respectively, The updated value of a corresponding KPI comprised in the at least one of the first set of Key Performance Indicators (KPIs) and the second set of Key Performance Indicators (KPIs) is indicative of infection of one or more employees and dependents being predicted at one or more aggregation levels of the one or more offices of the organization.

In an embodiment, the employee-based digital twin and the office-based digital twin are created by modeling information pertaining to employees comprising at least an age, a gender, one or more comorbidities, a vaccine status, dependents data, offices and projects details, one or more desks within one or more offices, and one or more facilities within the one or more offices. The employee-based digital twin comprises a first set of Key Performance Indicators (KPIs) with an associated initial value, and the office-based digital twin comprises a second set of Key Performance Indicators (KPIs) with an associated initial value respectively.

The above step of creating the employee-based digital twin (also referred as employee DT and interchangeably used herein) comprises receiving inputs such as age, gender, Comorbidity, Vaccination status, number of doses, doses date, vaccine name to initialize the vaccination status. Further inputs for creating the employee-based digital twin, include but are not limited to, infection status, location name (e.g., city name), parent office, work order number or support work order number (e.g., WON and/or SWON), Industry operating unit (IOU), branch, and the like. From the input, employees and dependents as actors (agents) are initialized in the model characterized by the above features. Comorbidity for covid19 comprises COPD, hypertension, diabetes, etc. Input data from data source only contains a Boolean value indicating the presence or absence of comorbidity in an employee and not specific comorbidity information of that employee. In presence of a comorbid condition, the assignment of the specific comorbidity is done in the model using probability distribution obtained from geography specific age wise and gender wise co-morbidity distribution. Susceptible, exposed, symptomatic, asymptomatic, severe, recovered, dead are the possible infection states. Infection data from the input consists only of the date of infection if the corresponding individual was infected previously. The model uses this data to set the initial infection state of the individuals. A household is created for each of the employee family (employee+dependents) residing in the home and homes are placed inside the city corresponding to city name of employee. In employee-based digital twin, random movement behavior within the home is modeled and the impact of infection due to movement within the Societies and public places are captured using s2e rate. By discussing with operation/business unit, KPIs from the simulation, which are infection results (Active infections, Daily infections, Cumulative Infections, Severe Cases, Mild Cases, Asymptomatic Cases) are reported at various levels of aggregation: SWON, IOU, city wise, branch wise infections, gender wise infections, age-group wise infections. Thereafter, the KPIs to be projected are encoded as a part of the simulation dashboard.

Similarly, the step of creating the office-based digital twin comprises receiving inputs such as Carpet Area, Seating Capacity, Capacity Allowed, percentage of total capacity allowed to utilize, Current Employee Count, total count at a given hour, whether the given sub-place is open or not, whether employee is eligible to go to office or not, Current Place, office, home, Current Subplace—for example in ODC, or in canteen, hourly visiting probability—contains probability of visit at each hour for all the sub-places. Further information for creation of office-based digital twin includes employee specific behavior other than behaviors mentioned in Employee DT such as (i) movement within office space is random similar to random movement within a home, (ii) inter sub-place movement (For e.g., canteen->meeting room) is modeled based on hourly visit probability of each place for the employee, (iii) movement like going to office and leaving office is modeled as fixed movement. If an employee is eligible to go to the office, then every weekday (can be tweaked by the intervention) he goes to office and leaves at a fixed time during the day as long as he is in 'susceptible' state or 'undetected infected' state. Other information such as infection specific behaviors include (a) Infection within a sub-place in Office or Home depends on population density within the place (area occupied by current employees/carpet area (or) current occupancy/Total seat capacity) and place type (open place or close place), (b) movement in an open place is considered to happen within a sub-area of the whole space (carpet area) whereas the movement in a close place happens over the entire given carpet area.

The one or more employees and the one or more dependents are created as a plurality of agents in the agent-based fine-grained model (ABM) comprised in the employee-based digital twin and the office-based digital twin respectively. Further, the plurality of agents and an environment of the ABM are initialized, using data comprising the epidemiological data, the demographic, project and health profile related features for the plurality of employees of the organization and the one or more associated dependents, the office and infrastructure data and the one or more organization specific location wise s2e rates respectively. The demographic, project and health related features of the employees of the organization and the associated dependents include but are not limited to (a) infection date—if the individual was infected in the past. (b) demographic characteristics: age, gender, city of residence, (c) health profile—is Comorbid or not, (d) vaccination information: first dose date, second dose date (if taken), subsequent doses, and vaccine type, (e) current city of residence, and the like. In addition to the above information, the system 100 has data specific to dependent and employee where, parent branch, Office, IOU, SWON is specific to employee and dependent identifier (ID) (associated employee id) specific to dependents. Similarly, the office and infrastructure data comprise but is not limited to (a) Organizational structure: list of offices with its city and parent branch, (b) Office Architecture: sectors and facilities both of which comprise several sub-Places (off-shore development center (ODC), Cabin, Lab, meeting room, canteen, pantry, auditorium, training rooms, Occupational Health Centre (OHC), gymnasium (also referred as Gym or fitness center)) and each of the sub-places having the characteristics {carpet area, capacity}, and the like. Such organization and office and infrastructure data shall not be construed as limiting the scope of the present disclosure. Once the plurality of agents and an environment of the ABM are initialized, a specific comorbid condition (or also referred as comorbidity and interchangeably used herein) for the plurality of agents in the ABM is assigned, using a probability distribution technique. The comorbid is obtained from a geography specific age wise and gender wise co-morbidity distribution of the data.

In the employee-based digital twin and the office-based digital twin, random movement behavior of the one or more employees is modelled and impact of infection due to movement within (i) one or more residences (ii) the one or more offices, and (iii) one or more public places wherein the impact of infection due to movement within one or more public places is captured using the one or more organization specific location wise s2e rates. The system 100 model captures relevant characteristics and behaviour of employees, their dependents, and support staff of an organization. As mentioned above, the system 100 captures the demographic details (i.e., age and gender), health information (i.e., pre-existing comorbidity and vaccination status), and Covid19 infection status where the system 100 consider five infection states (i.e., Susceptible, Exposed, Asymptomatic, Mild, Critical, Recovered and Deceased) as recommended by majority of the Covid19 pandemic models (e.g., He et al. 2020). The system 100 also captures the family structure of the employees that includes dependents, household location (i.e., the city where the employees are living), office (i.e., city where office is located) of the employees and support staff (wherein employees comprise associates of an organization and its support staff), and project details of the employees. In the workforce model as implemented by the system 100, an employee continues WFH in their respective home city unless they are instructed to return to office. During WFH, an employee may get exposed to Covid19 virus from their family members (termed as household infection) and/or as they interact with rest of the population for their personal activities (termed as locality induced infection). The system 100 models household to understand the probability of an employee (or a dependent) getting exposed through household infection. The locality (or location) induced infection is considered in location model. After getting exposed to a specific variant of Covid19 virus, each individual goes through different stages of infection starting from Exposed to Recovered or Deceased state depending on individual demographic characteristics, characteristics of infecting variant, vaccine status and its efficacy.

Employee may remain asymptomatic or develop mild symptom after a delay. Some individuals may develop severe symptom (i.e., Critical). An infected employee stays away from work (i.e., takes leave) after detection (due to symptoms, contract tracing, household testing) till they move to Recovered state—and the same with dependents. The system 100 considers an employee is impacted (and may take leave) if their dependent is infected (the system 100 terms such employees as impacted employees). Organization may send communication to employees (a strategic intervention) about resuming WFO for number of days in a month/week (e.g., twice in a week) starting from a specific date. Employees who have moved out of their work location city need to return on receiving this communication. In office they will use the desks and other facilities made available by office administration (a strategic intervention consideration to allow specific facility). An employee may receive infection from asymptomatic (and/or undetected) infectious office colleagues. This type of infection is termed as office induced infection. The system 100 also consider support staff coming to office and mixing with employees when office is open. Dynamics of office induced infection for employees and office staff is considered in office model.

Here, the system 100 adopts a fine-grained simulatable agent/actor model to precisely represent individualistic characteristics and behaviour of the employees, dependents and office staff as a set of interacting agents. The system 100 combines stochastic model along with agent model to consider realistic assumptions where precise data is not available and/or to replicate uncertain scenarios. For example, pre-existing comorbidity of employees, dependents and support staff might not be known to organization—there the system 100 uses city/country specific comorbidity distribution. Similarly, vaccination status for dependents may not be updated in employer record—there the system 100 uses vaccine adoption rate of the located city. Uncertain scenarios where the system 100 use stochastic behaviour includes: probability of an employee going to office in a given day, movements within the office, and employees using office facility at a given moment and so on. Key rationales for considering fine-grained representation of workforce include a) analysis is cognizant of the unique characteristics and heterogeneity of the workforce, b) this helps to understand the situations at multiple levels, e.g., for organization, branches, and projects and c) organizations have workforce related data to construct a fine-grained workforce model.

The ABM is then simulated for interaction of the plurality of agents with each other and with the environment according to a specified behavior leading to an infection. During the simulation of the ABM, one or more states and behaviors are modified using one or more interventions applied at one or more time stamps. The one or more interventions include (i) eligibility criteria of employees to come to office (Age range, Vaccination status, Infection Status), (ii) Operating Capacity of the office and the different sub-places within the office, which can be dynamically updated with time (For e.g., Allowing x % capacity from Date A, y % from Date B), and (iii) Which sub-places to keep open for access and which to keep closed and during what hours. The key objective of office model is to identify efficacy of candidate WFO strategies to minimize office induced infection. Here, the key aspects of an office are office desks and their proximity, typical Business Aligned Unit (BAU) movements of employees and support staff, and possible utilization of available facilities, such as canteen, meeting rooms, executive cabin, and gymnasium—which may be one of an organization structures. For WFO scenario, a percentage of employees and office staff visit office (an office intervention) during the business hours of the organization was obtained. In office, employees mostly spend time at their desk and use facilities based on certain pattern of movement with some randomness. Essentially, the transmission of infection from office colleagues depends on virus characteristics (as discussed in virus characteristics model), desks layout and employee congregation during business and casual activities within office—and similarly for support staff. Upon simulation, the updated value for each KPI comprised in at least one of the first set of KPIs and the second set of KPIs are identified accordingly. The updated value of the first set of KPIs and the second set of KPIs correspond to one or more infection results reported at the one or more aggregation levels. For instance, the first set of KPIs and the second set of KPIs comprise one or more active infected employees, one or more impacted employees whose one or more dependents are infected, aggregative level specific infection, age, and gender distributions, change in infection patterns due to employee movement during transition from one location to another location, and possibility of office induced infections, and infections from commute. Such KPIs shall not be construed as limiting the scope of the present disclosure.

The above simulation of the ABM is better understood by way of following description: The system 100 used a fine-grained agent-based model to represent relevant employee and support staff as agents and allow employee and support staff to visit offices to simulate the candidate WFO strategies. The agent-based formulation helps to define different fine-grained intervention, such as: different occupancies from a specific date (e.g., 25% employees from Apr. 1, 2022) for all or specific office, opening/closing facilities in a specific office (e.g., Gymnasium should be closed till Jun. 31, 2022), restricting occupancies within different facilities (e.g., 50% occupancy for Canteens and 30% occupancy for meeting rooms).

Simulation led experimentation: In the office-based digital twin (ODT) simulation, the system 100 decides the localities of interest by navigating cities where employees and offices are located. The model pertaining to locations is then contextualized and s2e rates are computed for all localities of interest. These location specific s2e rates are then normalized for organization using TFOrg. Transformed s2e rate is used in the workforce model instantiated with anonymized employee data to understand the emergent infection spread. Scenarios pertaining to WFO, and hybrid setup are experimented by combining office and intervention model. Simulation of a contextualized ODT helps to understand trends about KPIs of interest that include number of employees who will be unavailable due to Covid19 infection, employees who might be impacted (and thus may take leave) for infection of their dependents and number of office induced infections in case of WFO. Appropriate navigation of employees' relationship with the project, office, city and branch (as shown in FIG. 3) also helps to understand unit levels infection trends. Office-based digital twin (ODT) simulation led experimentation with various possibilities of opening offices (i.e., interventions to represent opening office with varying capacities, with limited facilities vs all facilities from specific date) and observation of simulated KPIs help to understand their consequences/impact over time. Moreover, experimentation can be conducted for different hypothetical scenarios such as situation if all Covid19 restrictions are lifted or population is not complying with any Covid19 norms (i.e., a worst case scenario), or extreme scenario when a new variant emerge in a locality, and so on.

To improve confidence level of the trend analysis/prediction of the system 100, all simulation scenarios were repeated multiple times (in) and KPIs are estimated based on an average of all simulation runs. Multiple runs for same scenario helps to converge KPI values that emerge from a combination of deterministic and stochastic behaviour of ODT. m was decided based on the below method:

---

Run simulation 5 times and compute average of all KPIs ($KPIs_{Avg}$)
while All KPIs have not converged do
    Run simulation and compute new average ($KPIs_{new}$) from all
    simulation runs.
   for all KPIs do
      if deviation of ($KPIs_{Avg}$) and $KPIs_{new}$ is under tolerable range then
        Converged:= True
      else
        $KPIs_{Avg}$:= $KPIs_{new}$
      end if
   end for
end while

---

The simulated ABM validated based on a convergence level of (i) the ABM and (ii) at least one of the first set of KPIs, and the second set of KPIs wherein the convergence level of the ABM is based on a total number of simulations required to converge all stochastic functions (n) which is determined by number of trials required on a probabilistic function having a Bernoulli trial (N), and the convergence level of at least one of the first set of KPIs and the second set of KPIs is based on number of simulations required for convergence on stable predictions without significant variances in a mean of results associated with each simulation. In other words, the system 100 validates the simulated ABM by involving stochastic behavior in the agent-based model at various stages and hence necessitates multiple runs (m) and averages out the results to get value near to the expected value. To determine m, two levels of convergence are to be established, one at model level and other at KPI level. Model level convergence can be done by identifying the smallest number of executions done on all the stochastic functions. Consider that the number is n. Then total number of simulations required to converge all the stochastic function will be m=(N/n), where N is the number of Bernoulli trials required on the probability function. However, for KPI level convergence, the heuristic the system 100 adopts is to run the simulation enough times until the simulation has converged on stable predictions without any significant difference in the mean of the results. The generated output for various KPIs is compared with the actual (observed) values and then the exposed model parameters are tweaked followed by re-simulation. This experimentation-validation cycle can continue until the model's predictions closely mimic the actual (observed) values.

The above validation of the simulated ABM may be better understood by way of following description: The system constitutes different agent types $a_1$, $a_2$, . . . , $a_q$ having probabilistic functions $f_{11}$, $f_{21}$, $f_{31}$ . . . $f_{qw}$ representing behavior of agent types and let $x_1$, $x_2$, . . . $x_e$ be the number of instances of $a_1$, $a_2$ . . . , $a_q$ respectively. For each function $f_{ij}$ of agent type $a_i$, number of instances of $a_i$ needs to be computed hat successfully invoked the function and this constitutes Bernoulli trails. Above point holds for all $a_i$. Secondly, from the above, an array constituting the Bernoulli trail counts of all the functions for each agent type $a_i$ is obtained. The min of the array ($c_i$) is obtained. The above holds for all $a_i$ and all the smallest cohort counts of each actor type $a_i$ in the form of array is obtained. The minimum of this array, say n would be the smallest cohort size of the complete model Let, required number of trials needed for a probabilistic function to converge to the expected value be N. This entails the total number of simulations to be performed is m=N/n. The system 100 introduces I, which is the number of simulations to ensure minimum runs. The heuristic the system 100 adopts is to run the simulation enough times until the simulation KPIs have converged on stable predictions without any significant variance in the mean of the results. Confidence intervals can be further calculated using any of the standard techniques known in the art.

Experimental Results

The present disclosure and its systems and methods contextualized ODT for a major geography $G_1$ of a large organization $X_1$ and predicted infection trends since March 2021 while it continued its business-as-usual operation mostly as WFH mode. ODT is also exploited to explore a wide range of strategies towards a safer WFH to WFO transitions.

Contextualization: To carry out the experimentation, ODT was instantiated to represent virus characteristics of known prominent variants (i.e., Alpha, Delta and Omicron) (WHO 2022). Hypothetical variants were considered by varying infectivity, severity, fatality rate and reinfection possibilities to explore worst case and extreme situations. The workforce model (or employee model comprised in the system 100) is contextualized with anonymized data of its 'x' employees who are living with 'y' number of dependent across says z+ cities in a country during WFH mode of operation. Age range (as opposed to specific age), gender, vaccination status, and infection status have also been considered.

Employee project, city, offices were mapped to anonymized employee agents for all large projects, cities and offices. This information has been generalized and mapped to a set of archetypes of projects, cities and offices for small projects, cities and offices—this helps to maintain anonymity without compromising the analysis precision. Missing comorbidity information is adjusted to country/city level distributions. Location of interest was reduced from 1800+ cities to 36 localities that include 25 cities, 10 states and a country for predicting s2e rates. This simplification was done in accordance with the organization data—around 60% employees were staying in 24 cities and these cities include location of all major branches and offices. Reflecting on job profiles and other socio-economical characteristics, the system 100 applied transformation function TFOrg to normalize s2e rates for employees and their family members. Location specific s2e rate was directly used to compute infection possibility of support staff. Office model was instantiated with its 140+ offices across 30+ branches and close to 100 large projects. Number of desks are matched with Admin data and facilities are instantiated using prominent archetypes of facilities derived from Admin data of the organization (e.g., X1 number of large canteens of capacity more than 500, X2 number of small canteens with capacity 50, and X3 medium meeting rooms with capacity 20 associates, and so on).

Validation

Figure 5A:
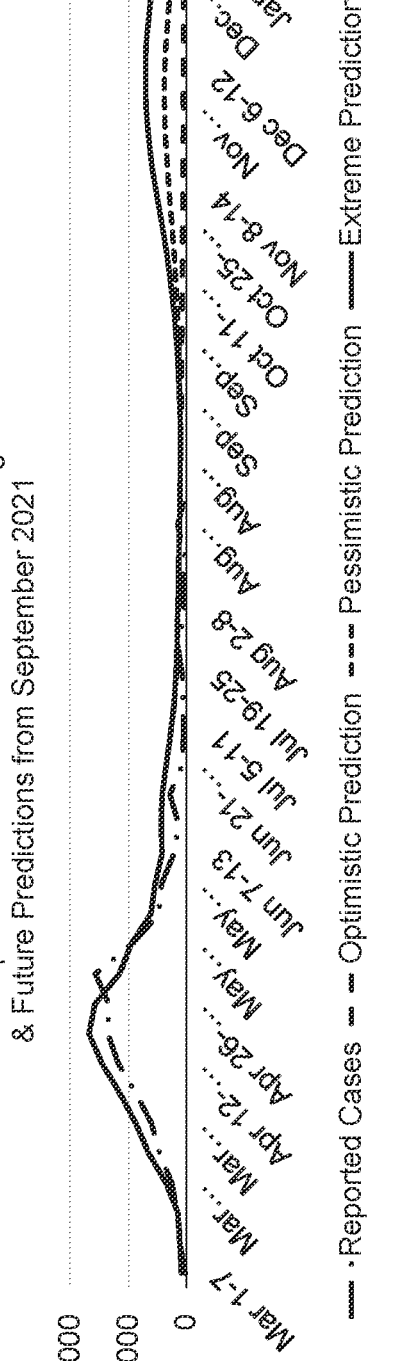
FIGS. 5A through 5C depict graphical representations illustrating prediction and validation of the system, in accordance with an embodiment of the present disclosure.
Figure 5B:
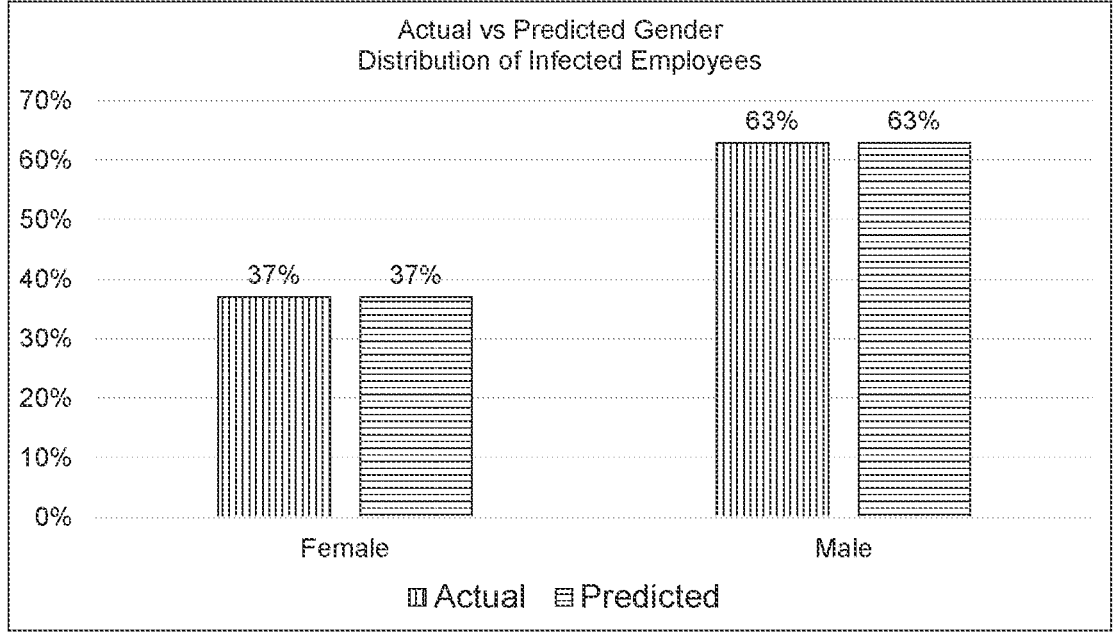
Figure 5C:
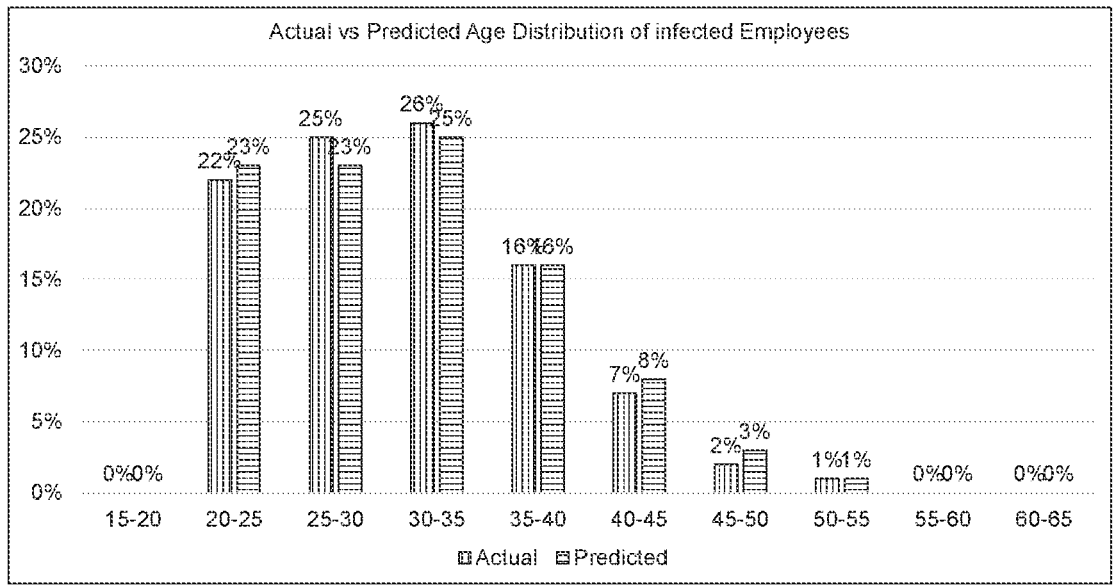
Figure 6:
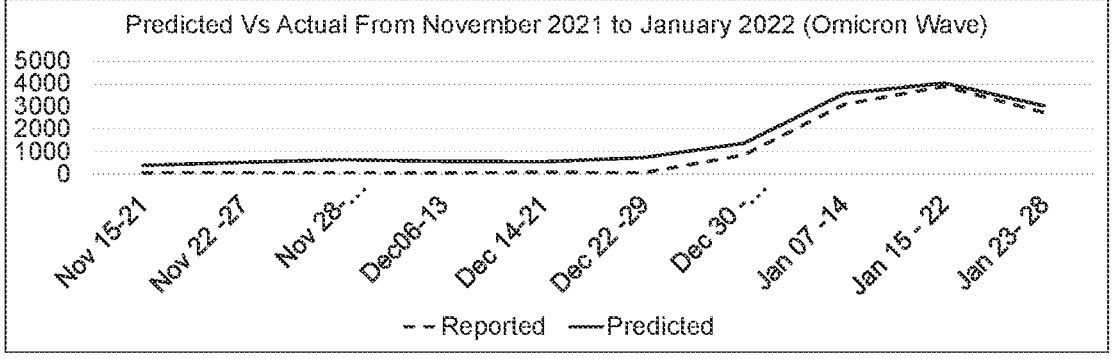
FIG. 6 depicts graphical representations of simulated prediction and observed infections during Omicron wave, in accordance with an embodiment of the present disclosure.

The system 100 conducted experiments by contextualizing a small branch with 5K employees who were operating from home. Simulation was conducted for January to June 2021 and compared simulated KPIs with reported cases. Next, a larger branch with 50K+ employees with multiple offices to establish the faithfulness of ODT was considered and finally a major geography G1 of company X with 425K+ employees were also considered for experimentation. The predictions in the month of September 2021 are shown in FIGS. 5A through 5C. More specifically, FIGS. 5A through 5C, with reference to FIGS. 1 through 4, depict graphical representation illustrating prediction and validation of the system 100, in accordance with an embodiment of the present disclosure. As shown in FIGS. 5A through 5C, the prediction about employee infection trend closely matches with weekly reported case from March 2021 to August 2021 (i.e., for the wave due to Delta variant). The distribution of genders and age groups are also comparable with the reported cases (other trends such as projection about project, city and branch level weekly infection counts are closely predicted but not included in this paper due to confidentiality). The predictions also include future trends for three scenarios: a) optimistic scenario (i.e., if Covid19 specific restrictions continues and no emergence of new variant), pessimistic scenario (i.e., significant movement relaxation and noncompliance of CAB but no new variant), and extreme scenario (pessimistic scenario+a new variant with high infectivity). As shown in FIGS. 5A through 5C, a potential surge from December 2021 to early January 2022 was estimated with relatively lower severity than Delta wave during the experimentation that was conducted. The experiments were reiterated by introducing Omicron variant. The analysis indicated the infection trend due to Omicron variant on $G_1$ will follow extreme scenario of the earlier prediction with 2-3 weeks delay in infection surge. A comparison of the revised prediction and reported cases is shown in FIG. 6. More specifically, FIG. 6, with reference to FIGS. 1 through 5C, depicts a graphical representation of simulated prediction and observed infections during Omicron wave, in accordance with an embodiment of the present disclosure.

Figure 7A:
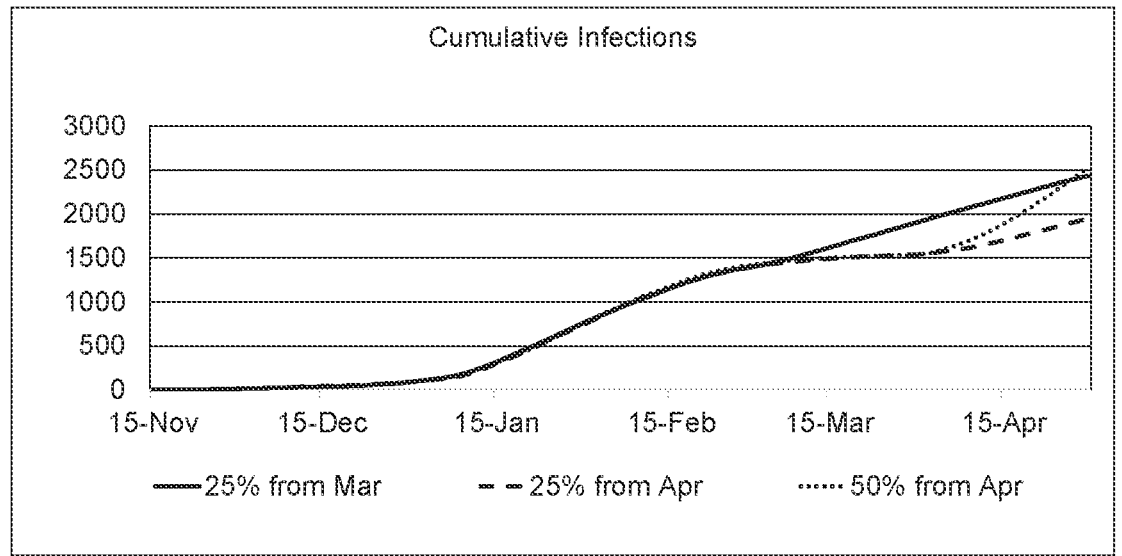
FIGS. 7A through 7C depict graphical representations illustrating selected simulation results from experimentations towards a safer transition from work from home (WFH) to work from office (WFO), in accordance with an embodiment of the present disclosure.
Figure 7B:
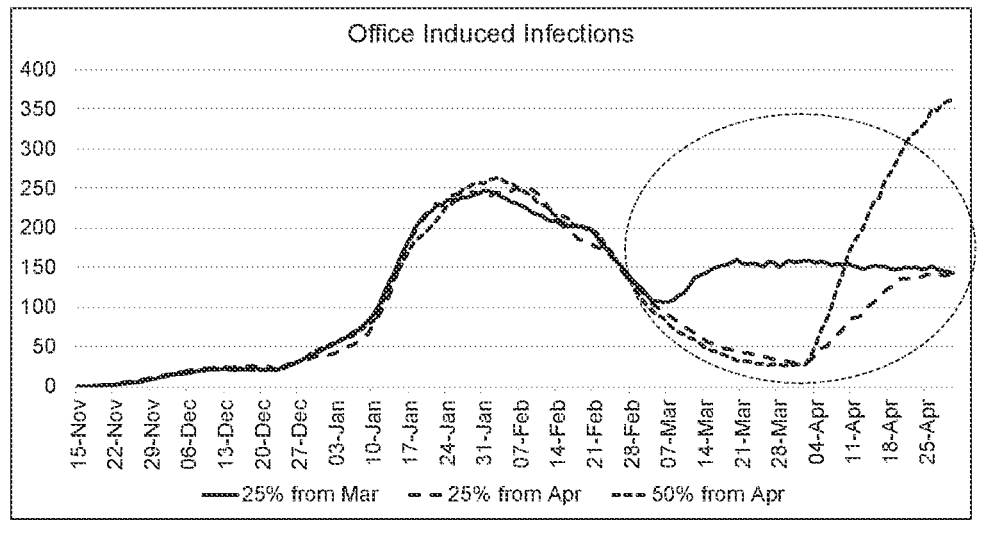
Figure 7C:
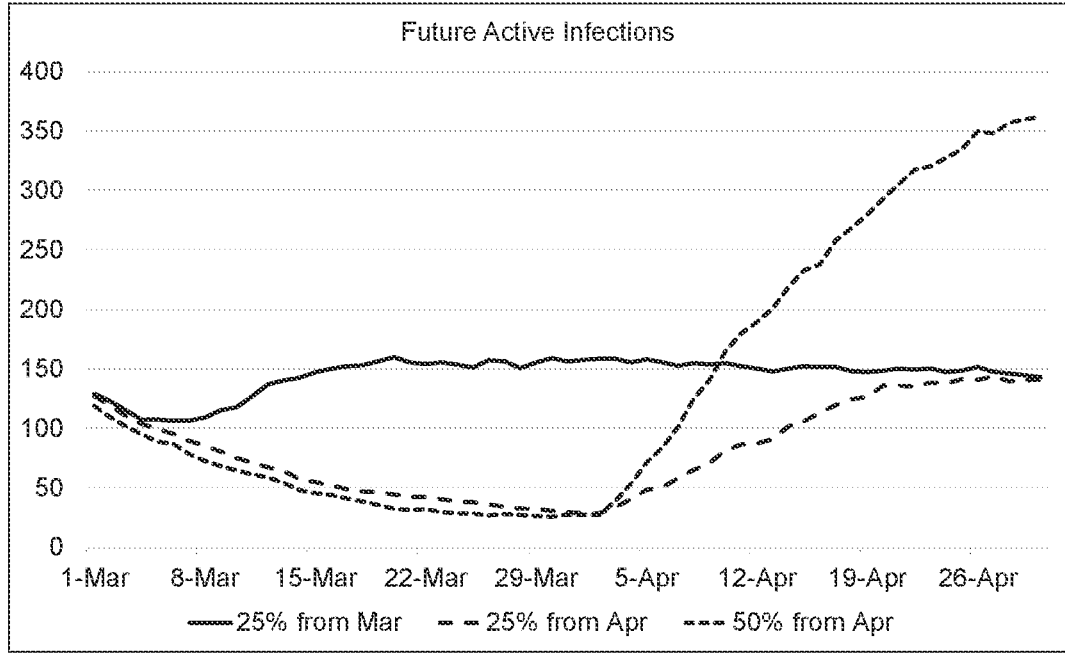

Exploring WFH to WFO transition: To help relevant stakeholders of $G_1$ with simulation led evidence towards a safer transition from WFH to WFO, the present disclosure conducted multiple experimentations considering different occupancy, timeline to consider transition, and possible micro interventions, such as (partially) allowing/restricting canteens, labs, meeting rooms, gymnasium, etc. FIGS. 7A through 7C, with reference to FIGS. 1 through 6, depicts graphical representations illustrating selected simulation results from experimentations towards a safer transition from work from home (WFH) to work from office (WFO), in accordance with an embodiment of the present disclosure. More specifically, FIGS. 7A through 7C show a comparative analysis of three illustrative scenarios: a) 25% employees returning to office (occupancy) from March 2022, b) 25% occupancy from April 2022, and c) 50% occupancy from April. In these scenarios, the system 100 considered canteens are open with 50% capacity, medium to large meeting rooms are open with 50% capacity, labs are open, and rest of the facilities are closed. The experimentations indicate opening office with 25% occupancy from April is safer than opening office with same occupancy from March. Allowing 50% occupancy from April may cause surge in infection count—mainly to those offices where number of desks are more than 5K and number of meeting rooms and canteen capacity are less. Moreover, instances of office induced infection will be significantly high for 50% occupancy.

Business Impacts for $G_1$: The ODT led experimentation findings were used by stakeholders of $G_1$: risk and compliance unit used predictions for refining Business Continuity Plan (BCP) during the Delta and Omicron waves of Covid19. A potential surge of infection for $G_1$ during December 2021 was predicted 3 months in advance. Possible consequences for potential strategies towards a safer return to a new normal were experimented in advanced and shared with decision-maker to make a trade-off between % of WFO vs employee health safety, and branch and project level BCP were refined. It is observed that the experimentations helped $G_1$ to improve: i) operational efficiency and resilience as many alternatives are evaluated and consequences are shared in advance, ii) operational cost for two reasons: a) cost effective test environment, and b) validated course of action has less chance for failure and business loss while dealing with Covid19 related uncertainties, iii) agility in change management. It also helped to improve employee safety and customer satisfaction (with advance communications about potential delay in deliverables).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:

receiving, via one or more hardware processors, an input data comprising epidemiological data of a population in one or more locations;

modelling, via the one or more hardware processors, an instance of a stock and flow model for each of the one or more locations based on a plurality of employees and one or more offices of an organization associated with the one or more locations to obtain one or more instances of location specific stock and flow models;

calculating, by the one or more instances of location specific stock and flow models via the one or more hardware processors, one or more location specific susceptible to exposure (s2e) rates, wherein the susceptible to exposure (s2e) rate of the one or more locations is calculated from a probability of contact and a learnable variable;

applying, a statistical decay function via the one or more hardware processors, on the one or more location specific susceptible to exposure (s2e) rates and converting the one or more location specific s2e rates to one or more organization specific s2e rates to obtain one or more organization specific location wise s2e rates, wherein each of the one or more organization specific s2e rates corresponds to a specific location amongst the one or more locations, and wherein the one or more organization specific location wise s2e rates comprises differences in demographic characteristics, health profile related features, and pandemic specific behaviour of the plurality of employees of the organization and the one or more associated dependents;

creating, via the one or more hardware processors, at least one of (a) an employee-based digital twin based on (i) the epidemiological data, (ii) a demographic and health profile related features for the plurality of employees of the organization and the one or more associated dependents, (iii) the one or more organization specific location wise s2e rates, and (b) an office-based digital twin based on (i) the epidemiological data, (ii) the demographic and health profile related features for the plurality of employees of the organization and the one or more associated dependents, (iii) an office and infrastructure data, and (iv) the one or more organization specific location wise s2e rates, wherein the employee-based digital twin and the office-based digital twin are created by modeling information pertaining to employees comprising at least an age, a gender, one or more comorbidities, a vaccine status, dependents data, the one or more offices, one or more employee associated project details, one or more desks within one or more offices, and one or more facilities within the one or more offices, wherein the employee-based digital twin comprises a first set of Key Performance Indicators (KPIs) with an associated initial value, and wherein the office-based digital twin comprises a second set of Key Performance Indicators (KPIs) with an associated initial value, wherein the first set of KPIs and the second set of KPIs are encoded and projected as a part of a simulation dashboard;

identifying, via the one or more hardware processors, an updated value of a corresponding KPI comprised in the at least one of the first set of Key Performance Indicators (KPIs) and the second set of Key Performance Indicators (KPIs) based on a simulation of the at least one of the employee-based digital twin and the office-based digital twin respectively, wherein the updated value of a corresponding KPI comprised in the at least one of the first set of Key Performance Indicators (KPIs) and the second set of Key Performance Indicators (KPIs) is indicative of infection of one or more employees and dependents being predicted at one or more aggregation levels of the one or more offices of the organization, wherein identifying the updated value for each KPI comprised in the first set of KPIs and the second set of KPIs comprises:

creating, the one or more employees and the one or more dependents as a plurality of agents in the agent-based fine-grained model (ABM) comprised in the employee-based digital twin and the office-based digital twin respectively;

instantiating, the plurality of agents and an environment of the ABM, using data comprising the epidemiological data, the demographic, project and health profile related features for the plurality of employees of the organization and the one or more associated dependents, the office and infrastructure data and the one or more organization specific location wise s2e rates respectively;

assigning, a specific comorbid for the plurality of agents in the ABM, using a probability distribution technique, obtained from a geography specific age wise and gender wise co-morbidity distribution of the data, wherein in the employee-based digital twin and the office-based digital twin, random movement behavior of the one or more employees is modelled and impact of infection due to movement within (i) one or more residences (ii) the one or more offices, and (iii) one or more public places captured using the one or more organization specific location wise s2e rates;

simulating the ABM for interaction of the plurality of agents with each other and with the environment according to a specified behavior leading to an infection, wherein during the simulation of the ABM, one or more states and behaviors are modified using one or more interventions applied at one or more time stamps, wherein the fine-grained agent-based model represents employee and support staff as agents and allow the employee and the support staff to visit offices to simulate candidate WFO strategies, wherein the fine-grained agent-based model defines varied fine-grained intervention including varied occupancies on a specific date for all or specific office, opening/closing facilities in a specific office, and restricting occupancies within varied facilities; and identifying the updated value for each KPI comprised in at least one of the first set of KPIs and the second set of KPIs from the simulated ABM, wherein the updated value of the first set of KPIs and the second set of KPIs correspond to one or more infection results reported at the one or more aggregation levels;

identifying an infection trend due to a variant on a geography following scenario of an earlier prediction with 2-3 weeks delay in an infection surge; and providing a hybrid modelling and simulation approach combining an agent-based fine-grained model (ABM) and a coarse-grained stock-and-flow model, and leverages past macro-level data pertaining to pandemic evolution in cities, states, and countries amenable for collective analysis.

2. The processor implemented method as claimed in claim 1, wherein the stock and flow model is modelled based on a Susceptible-Exposed-Infected-Recovered (SEIR) model, and wherein the stock and flow model comprises a plurality of stocks, a plurality of auxiliary variables, a sequential phase of infection and one or more phases of vaccination, in the population modelled by the plurality of stocks, a plurality of flows, that govern the plurality of stocks to and from movement of the population, and a plurality of configuration delays.

3. The processor implemented method as claimed in claim 2, wherein one or more phases of spread of an infection within the population are modelled based on the plurality of stocks, and movement of the population between the plurality of stocks is controlled based on the plurality of flows, wherein the plurality of flows comprises a plurality of infection flows and a plurality of vaccination flows, wherein a time gap between movement of the population from one stock to another stock among the plurality of stocks is modelled based on the plurality of configuration delays, and wherein the plurality of stocks is initialized and one or more values required to incorporate the epidemiological data into the plurality of flows are stored based on the plurality of auxiliary variables.

4. The processor implemented method as claimed in claim 1, wherein the learnable variable is configured to tune the probability of contact, and wherein the probability of contact is determined as a ratio of infected population to a total living population by using the probability of contact and the learnable variable.

5. The processor implemented method as claimed in claim 1, wherein the one or more organization specific location wise s2e rates obtained (i) factor in an impedance mismatch prevalent with respect to a specific location, and (ii) refrain from comprising infection information pertaining to one or more employees of the one or more offices and one or more dependents of the one or more employees, accounted in the stock and flow model.

6. The processor implemented method as claimed in claim 1, comprising validating the simulated ABM based on a convergence level of (i) the ABM and (ii) at least one of the first set of KPIs, and the second set of KPIs, wherein the convergence level of the ABM is based on a total number of simulations required to converge all stochastic functions (n) which is determined by number of trials required on a probabilistic function having a Bernoulli trial (N), and wherein the convergence level of at least one of the first set of KPIs and the second set of KPIs is based on number of simulations required for convergence on stable predictions without significant variances in a mean of results associated with each simulation, and an output generated for first set of KPIs and the second set of KPIs is compared with an observed values and the learnable variable are tweaked followed by re-simulation, and validation of the simulated ABM continues until predictions by the ABM closely mimic the observed values, wherein the number of simulations is repeated and at least one of the first set of KPIs and the second set of KPIs are estimated based on an average of all simulation runs, and multiple runs for the specified scenario converge KPI values that emerge from a combination of a deterministic behavior and a stochastic behavior of the office-based digital twin.

7. The processor implemented method as claimed in claim 1, wherein the first set of KPIs and the second set of KPIs comprise one or more active infected employees, one or more impacted employees whose one or more dependents are infected, aggregative level specific infection, age and gender distributions, change in infection patterns due to employee movement during transition from one location to another location, and possibility of office induced infections, and infections from commute.

8. A system, comprising:

a memory storing instructions;

one or more communication interfaces; and one or more hardware processors coupled to the memory via the one or more communication interfaces, wherein the one or more hardware processors are configured by the instructions to:

receive an input data comprising epidemiological data of a population in one or more locations;

model an instance of a stock and flow model for each of the one or more locations based on a plurality of employees and one or more offices of an organization associated with the one or more locations to obtain one or more instances of location specific stock and flow models;

calculate, by the one or more instances of location specific stock and flow models, one or more location specific susceptible to exposure (s2e) rates, wherein the susceptible to exposure (s2e) rate of the one or more locations is calculated from a probability of contact and a learnable variable;

apply, a statistical decay function, on the one or more location specific susceptible to exposure (s2e) rates and converting the one or more location specific s2e rates to one or more organization specific s2e rates to obtain one or more organization specific location wise s2e rates, wherein each of the one or more organization specific s2e rates corresponds to a specific location amongst the one or more locations, and wherein the one or more organization specific location wise s2e rates comprises differences in demographic characteristics, health profile related features, and pandemic specific behaviour of the plurality of employees of the organization and the one or more associated dependents;

create at least one of (a) an employee-based digital twin based on (i) the epidemiological data, (ii) a demographic and health profile related features for the plurality of employees of the organization and the one or more associated dependents, (iii) the one or more organization specific location wise s2e rates, and (b) an office-based digital twin based on (i) the epidemiological data, (ii) the demographic and health profile related features for the plurality of employees of the organization and the one or more associated dependents, (iii) an office and infrastructure data, and (iv) the one or more organization specific location wise s2e rates, wherein the employee-based digital twin and the office-based digital twin are created by modeling information pertaining to employees comprising at least an age, a gender, one or more comorbidities, a vaccine status, dependents data, the one or more offices, one or more employee associated project details, one or more desks within one or more offices, and one or more facilities within the one or more offices, wherein the employee-based digital twin comprises a first set of Key Performance Indicators (KPIs) with an associated initial value, and wherein the office-based digital twin comprises a second set of Key Performance Indicators (KPIs) with an associated initial value, wherein the first set of KPIs and the second set of KPIs are encoded and projected as a part of a simulation dashboard;

identify an updated value of a corresponding KPI comprised in the at least one of the first set of Key Performance Indicators (KPIs) and the second set of Key Performance Indicators (KPIs) based on a simulation of the at least one of the employee-based digital twin and the office-based digital twin respectively, wherein the updated value of a corresponding KPI comprised in the at least one of the first set of Key Performance Indicators (KPIs) and the second set of Key Performance Indicators (KPIs) is indicative of infection of one or more employees and dependents being predicted at one or more aggregation levels of the one or more offices of the organization, wherein the updated value for each KPI comprised in the first set of KPIs and the second set of KPIs is identified by:

creating, the one or more employees and the one or more dependents as a plurality of agents in the agent-based fine-grained model (ABM) comprised in the employee-based digital twin and the office-based digital twin respectively;

instantiating, the plurality of agents and an environment of the ABM, using data comprising the epidemiological data, the demographic, project and health profile related features for the plurality of employees of the organization and the one or more associated dependents, the office and infrastructure data and the one or more organization specific location wise s2e rates respectively;

assigning, a specific comorbid for the plurality of agents in the ABM, using a probability distribution technique, obtained from a geography specific age wise and gender wise co-morbidity distribution of the data, wherein in the employee-based digital twin and the office-based digital twin, random movement behavior of the one or more employees is modelled and impact of infection due to movement within (i) one or more residences (ii) the one or more offices, and (iii) one or more public places captured using the one or more organization specific location wise s2e rates;

simulating the ABM for interaction of the plurality of agents with each other and with the environment according to a specified behavior leading to an infection, wherein during the simulation of the ABM, one or more states and behaviors are modified using one or more interventions applied at one or more time stamps, wherein the fine-grained agent-based model represents employee and support staff as agents and allow the employee and the support staff to visit offices to simulate candidate WFO strategies, wherein the fine-grained agent-based model defines varied fine-grained intervention including varied occupancies on a specific date for all or specific office, opening/closing facilities in a specific office, and restricting occupancies within varied facilities; and identifying the updated value for each KPI comprised in at least one of the first set of KPIs and the second set of KPIs from the simulated ABM, wherein the updated value of the first set of KPIs and the second set of KPIs correspond to one or more infection results reported at the one or more aggregation levels;

identifying an infection trend due to a variant on a geography following scenario of an earlier prediction with 2-3 weeks delay in an infection surge; and providing a hybrid modelling and simulation approach combining an agent-based fine-grained model (ABM) and a coarse-grained stock-and-flow model, and leverages past macro-level data pertaining to pandemic evolution in cities, states, and countries amenable for collective analysis.

9. The system as claimed in claim 8, wherein the stock and flow model is modelled based on a Susceptible-Exposed-Infected-Recovered (SEIR) model, and wherein the stock and flow model comprises a plurality of stocks, a plurality of auxiliary variables, a sequential phase of infection and one or more phases of vaccination, in the population modelled by the plurality of stocks, a plurality of flows, that govern the plurality of stocks to and from movement of the population, and a plurality of configuration delays.

10. The system as claimed in claim 9, wherein one or more phases of spread of an infection within the population are modelled based on the plurality of stocks, and movement of the population between the plurality of stocks is controlled based on the plurality of flows, wherein the plurality of flows comprises a plurality of infection flows and a plurality of vaccination flows, wherein a time gap between movement of the population from one stock to another stock among the plurality of stocks is modelled based on the plurality of configuration delays, and wherein the plurality of stocks is initialized and one or more values required to incorporate the epidemiological data into the plurality of flows based on the plurality of auxiliary variables.

11. The system as claimed in claim 8, wherein the learnable variable is configured to tune the probability of contact, and wherein the probability of contact is determined as a ratio of infected population to a total living population by using the probability of contact and the learnable variable.

12. The system as claimed in claim 8, wherein the one or more organization specific location wise s2e rates obtained (i) factor in an impedance mismatch prevalent with respect to a specific location, and (ii) refrain from comprising infection information pertaining to one or more employees of the one or more offices and one or more dependents of the one or more employees, accounted in the stock and flow model.

13. The system as claimed in claim 8, wherein the simulated ABM is validated based on a convergence level of (i) the ABM and (ii) at least one of the first set of KPIs, and the second set of KPIs, wherein the convergence level of the ABM is based on a total number of simulations required to converge all stochastic functions (n) which is determined by number of trials required on a probabilistic function having a Bernoulli trial (N), and wherein the convergence level of at least one of the first set of KPIs and the second set of KPIs is based on number of simulations required for convergence on stable predictions without significant variances in a mean of results associated with each simulation and an output generated for first set of KPIs and the second set of KPIs is compared with an observed values and the learnable variable are tweaked followed by re-simulation, and validation of the simulated ABM continues until predictions by the ABM closely mimic the observed values, wherein the number of simulations is repeated and at least one of the first set of KPIs and the second set of KPIs are estimated based on an average of all simulation runs, and multiple runs for the specified scenario converge KPI values that emerge from a combination of a deterministic behavior and a stochastic behavior of the office-based digital twin.

14. The system as claimed in claim 8, wherein the first set of KPIs and the second set of KPIs comprise one or more active infected employees, one or more impacted employees whose one or more dependents are infected, aggregative level specific infection, age, and gender distributions, change in infection patterns due to employee movement during transition from one location to another location, and possibility of office induced infections, and infections from commute.

15. One or more non-transitory machine-readable information storage mediums comprising one or more instructions which when executed by one or more hardware processors cause a method for business continuity plan and safe return to workplace by:

receiving an input data comprising epidemiological data of a population in one or more locations;

modelling an instance of a stock and flow model for each of the one or more locations based on a plurality of employees and one or more offices of an organization associated with the one or more locations to obtain one or more instances of location specific stock and flow models;

calculating, by the one or more instances of location specific stock and flow models, one or more location specific susceptible to exposure (s2e) rates, wherein the susceptible to exposure (s2e) rate of the one or more locations is calculated from a probability of contact and a learnable variable;

applying, a statistical decay function, on the one or more location specific susceptible to exposure (s2e) rates and converting the one or more location specific s2e rates to one or more organization specific s2e rates to obtain one or more organization specific location wise s2e rates, wherein each of the one or more organization specific s2e rates corresponds to a specific location amongst the one or more locations, and wherein the one or more organization specific location wise s2e rates comprises differences in demographic characteristics, health profile related features, and pandemic specific behaviour of the plurality of employees of the organization and the one or more associated dependents;

creating at least one of (a) an employee-based digital twin based on (i) the epidemiological data, (ii) a demographic and health profile related features for the plurality of employees of the organization and the one or more associated dependents, (iii) the one or more organization specific location wise s2e rates, and (b) an office-based digital twin based on (i) the epidemiological data, (ii) the demographic and health profile related features for the plurality of employees of the organization and the one or more associated dependents, (iii) an office and infrastructure data, and (iv) the one or more organization specific location wise s2e rates, wherein the employee-based digital twin and the office-based digital twin are created by modeling information pertaining to employees comprising at least an age, a gender, one or more comorbidities, a vaccine status, dependents data, the one or more offices, one or more employee associated project details, one or more desks within one or more offices, and one or more facilities within the one or more offices, wherein the employee-based digital twin comprises a first set of Key Performance Indicators (KPIs) with an associated initial value, and wherein the office-based digital twin comprises a second set of Key Performance Indicators (KPIs) with an associated initial value, wherein the first set of KPIs and the second set of KPIs are encoded and projected as a part of a simulation dashboard; and identifying an updated value of a corresponding KPI comprised in the at least one of the first set of Key Performance Indicators (KPIs) and the second set of Key Performance Indicators (KPIs) based on a simulation of the at least one of the employee-based digital twin and the office-based digital twin respectively, wherein the updated value of a corresponding KPI comprised in the at least one of the first set of Key Performance Indicators (KPIs) and the second set of Key Performance Indicators (KPIs) is indicative of infection of one or more employees and dependents being predicted at one or more aggregation levels of the one or more offices of the organization, wherein the step of identifying the updated value for each KPI comprised in the first set of KPIs and the second set of KPIs comprises:

creating, the one or more employees and the one or more dependents as a plurality of agents in the agent-based fine-grained model (ABM) comprised in the employee-based digital twin and the office-based digital twin respectively;

instantiating, the plurality of agents and an environment of the ABM, using data comprising the epidemiological data, the demographic, project and health profile related features for the plurality of employees of the organization and the one or more associated dependents, the office and infrastructure data and the one or more organization specific location wise s2e rates respectively;

assigning, a specific comorbid for the plurality of agents in the ABM, using a probability distribution technique, obtained from a geography specific age wise and gender wise co-morbidity distribution of the data, wherein in the employee-based digital twin and the office-based digital twin, random movement behavior of the one or more employees is modelled and impact of infection due to movement within (i) one or more residences (ii) the one or more offices, and (iii) one or more public places captured using the one or more organization specific location wise s2e rates;

simulating the ABM for interaction of the plurality of agents with each other and with the environment according to a specified behavior leading to an infection, wherein during the simulation of the ABM, one or more states and behaviors are modified using one or more interventions applied at one or more time stamps, wherein the fine-grained agent-based model represents employee and support staff as agents and allow the employee and the support staff to visit offices to simulate candidate WFO strategies, wherein the fine-grained agent-based model defines varied fine-grained intervention including varied occupancies on a specific date for all or specific office, opening/closing facilities in a specific office, and restricting occupancies within varied facilities;

identifying the updated value for each KPI comprised in at least one of the first set of KPIs and the second set of KPIs from the simulated ABM, wherein the updated value of the first set of KPIs and the second set of KPIs correspond to one or more infection results reported at the one or more aggregation levels;

identifying an infection trend due to a variant on a geography following scenario of an earlier prediction with 2-3 weeks delay in an infection surge; and providing a hybrid modelling and simulation approach combining an agent-based fine-grained model (ABM) and a coarse-grained stock-and-flow model, and leverages past macro-level data pertaining to pandemic evolution in cities, states, and countries amenable for collective analysis.

16. The one or more non-transitory machine-readable information storage mediums of claim 15, wherein the stock and flow model is modelled based on a Susceptible-Exposed-Infected-Recovered (SEIR) model, wherein the stock and flow model comprises a plurality of stocks, a plurality of auxiliary variables, a sequential phase of infection and one or more phases of vaccination, in the population modelled by the plurality of stocks, a plurality of flows, that govern the plurality of stocks to and from movement of the population, and a plurality of configuration delays, wherein one or more phases of spread of an infection within the population are modelled based on the plurality of stocks, and movement of the population between the plurality of stocks is controlled based on the plurality of flows, wherein the plurality of flows comprises a plurality of infection flows and a plurality of vaccination flows, wherein a time gap between movement of the population from one stock to another stock among the plurality of stocks is modelled based on the plurality of configuration delays, wherein the plurality of stocks is initialized and one or more values required to incorporate the epidemiological data into the plurality of flows are stored based on the plurality of auxiliary variables, wherein the learnable variable is configured to tune the probability of contact, and wherein the probability of contact is determined as a ratio of infected population to a total living population by using the probability of contact and the learnable variable, wherein the one or more organization specific location wise s2e rates obtained (i) factor in an impedance mismatch prevalent with respect to a specific location, and (ii) refrain from comprising infection information pertaining to one or more employees of the one or more offices and one or more dependents of the one or more employees, accounted in the stock and flow model.

17. The one or more non-transitory machine-readable information storage mediums of claim 15, wherein the one or more instructions which when executed by the one or more hardware processors further cause validating the simulated ABM based on a convergence level of (i) the ABM and (ii) at least one of the first set of KPIs, and the second set of KPIs, wherein the convergence level of the ABM is based on a total number of simulations required to converge all stochastic functions (n) which is determined by number of trials required on a probabilistic function having a Bernoulli trial (N), wherein the convergence level of at least one of the first set of KPIs and the second set of KPIs is based on number of simulations required for convergence on stable predictions without significant variances in a mean of results associated with each simulation and an output generated for first set of KPIs and the second set of KPIs is compared with an observed values and the learnable variable are tweaked followed by re-simulation, and validation of the simulated ABM continues until predictions by the ABM closely mimic the observed values, wherein the number of simulations is repeated and at least one of the first set of KPIs and the second set of KPIs are estimated based on an average of all simulation runs, and multiple runs for the specified scenario converge KPI values that emerge from a combination of a deterministic behavior and a stochastic behavior of the office-based digital twin, and wherein the first set of KPIs and the second set of KPIs comprise one or more active infected employees, one or more impacted employees whose one or more dependents are infected, aggregative level specific infection, age and gender distributions, change in infection patterns due to employee movement during transition from one location to another location, and possibility of office induced infections, and infections from commute.

\* \* \* \* \*